United States Patent [19]

Ayata et al.

[11] Patent Number: 4,521,805
[45] Date of Patent: Jun. 4, 1985

[54] PRINTING APPARATUS OR SYSTEM

[75] Inventors: Naoki Ayata, Machida; Seiji Saito, Yokosuka; Hidetoshi Suzuki; Kunitaka Ozawa, both of Tokyo; Noboru Koumura, Narashino; Koji Kazuma, Tokyo, all of Japan

[73] Assignee: Canon Kabushiki Kaisha, Tokyo, Japan

[21] Appl. No.: 370,464

[22] Filed: Apr. 21, 1982

[30] Foreign Application Priority Data

| Apr. 24, 1981 | [JP] | Japan | 56-61421 |
| Apr. 24, 1981 | [JP] | Japan | 56-61422 |
| Apr. 27, 1981 | [JP] | Japan | 56-62542 |
| Apr. 28, 1981 | [JP] | Japan | 56-63462 |
| Apr. 28, 1981 | [JP] | Japan | 56-63463 |

[51] Int. Cl.$^3$ .............................................. H04N 1/46
[52] U.S. Cl. .................................... 358/75; 358/298; 358/296
[58] Field of Search ............... 358/75, 78, 256, 285, 358/296, 298, 299, 300, 302, 258, 283, 287; 355/24, 26, 46, 4, 5.3 R

[56] References Cited

U.S. PATENT DOCUMENTS

| 3,588,322 | 6/1971 | Bartel | 358/75 |
| 4,342,051 | 7/1982 | Suzuki | 358/298 |
| 4,415,913 | 11/1983 | Diddens | 358/298 |

Primary Examiner—Michael A. Masinick
Attorney, Agent, or Firm—Fitzpatrick, Cella, Harper & Scinto

[57] ABSTRACT

A printing apparatus has at least one first recording head and at least one second recording head. These recording heads allow recording in binary mode, halftone mode, normal mode, and fine mode. A printing system has at least two recording units. One recording unit has a plurality of recording heads for recording in yellow, cyan and magenta, and the other recording unit has a recording head for recording in black. Upon a signal scanning operation, the printing system is capable of printing a plurality of copies at high speed and with good quality. A change in size of the original does not result in a problem since the apparatus is capable of feeding a recording paper sheet of corresponding size or printing only for a desired length.

23 Claims, 36 Drawing Figures

FIG. 5A
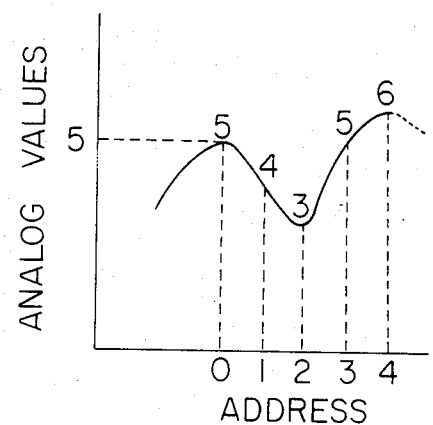
FIG. 5B
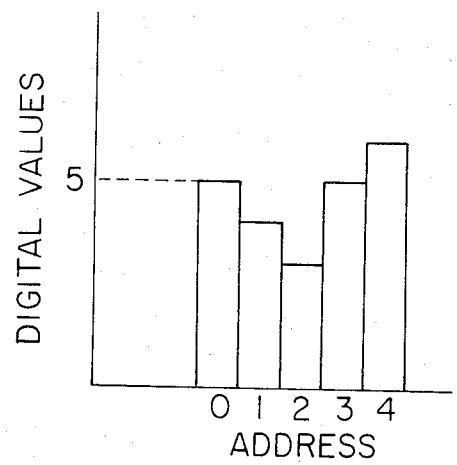
FIG. 5C   FIG. 5D   FIG. 5E
| 0 | 1 | 2 | 3 |
|---|---|---|---|
| 4 | 5 | 6 | 7 |
| 8 | 9 | 10 | 11 |
| 12 | 13 | 14 | 15 |
| 2 | 3 | 8 | 0 |
|---|---|---|---|
| 9 | 17 | 1 | 13 |
| 4 | 15 | 6 | 12 |
| 10 | 11 | 5 | 14 |

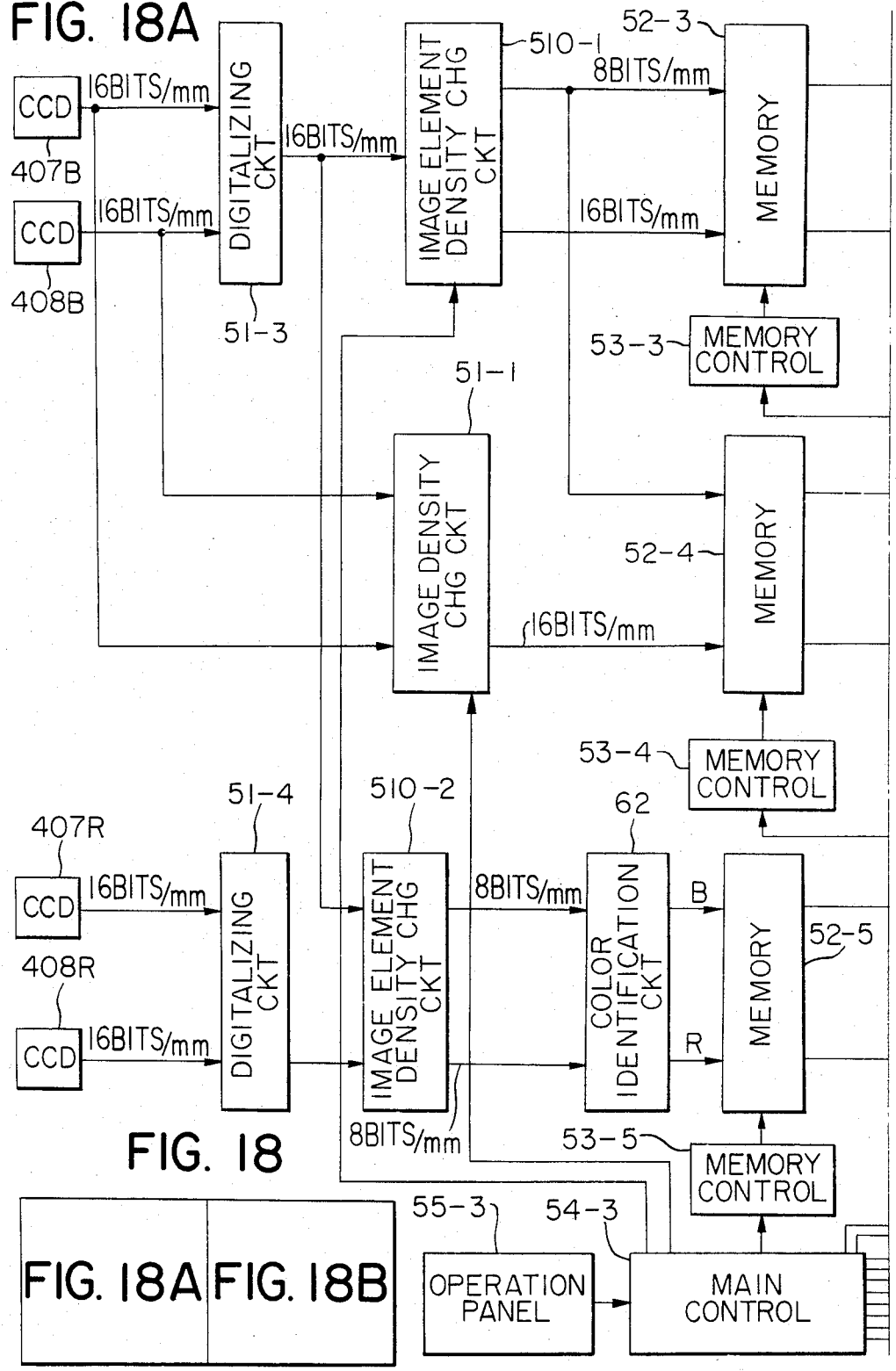

| FIG. 26A | FIG. 26B |

PRINTING APPARATUS OR SYSTEM

BACKGROUND OF THE INVENTION

1. Field of the Invention

The present invention relates to a printing apparatus or system for forming an image on a recording medium.

2. Description of the Prior Art

Various types of recording apparatuses are known including copying machines utilizing electrophotography or inkjet recording apparatuses. However, in order to reproduce the image of the same original or some source on a plurality of recording paper sheets (especially in different modes), the same recording procedure must be performed a corresponding number of times. This means that reproduction of hard copies of a desired number requires time which is the product of the time required for a single recording operation and the desired number of hard copies.

Furthermore, production of a fine mode copy (copy of good image quality) and a normal mode copy (copy of high copying speed) requires separate copying apparatuses having corresponding functions.

Since the same printing head is used in the same printing mode irrespective of paper size with the conventional printing apparatuses, reproduction of images on recording medium of small size is uneconomical.

In a conventional printing apparatus for printing with a printing head in black and full-color, black is reproduced by yellow, magenta and cyan, so clear images are hard to obtain.

SUMMARY OF THE INVENTION

It is an object of the present invention to provide a printing apparatus or system which alleviates the drawbacks of the prior art printing apparatuses.

It is another object of the present invention to provide a printing apparatus or system which is capable of reducing to the minimum time required for producing a plurality of recorded images.

It is still another object of the present invention to provide a printing apparatus or system with which high quality image recording and high-speed processing may be freely selected.

It is still another object of the present invention to provide a printing apparatus or system with which a printing head is appropriately used.

It is still another object of the present invention to provide a copying machine which is capable of providing a plurality of hard copies reproduced in a plurality of modes by a single scanning operation.

It is still another object of the present invention to provide a printing apparatus or system which is capable of simultaneously recording images of different data pieces on separate recording media and which is still capable of recording images of different data pieces on a single recording medium.

It is still another object of the present invention to provide a printing apparatus or system which is capable of recording clear black and polychromatic images.

It is still another object of the present invention to provide an improvement in a printing apparatus or system having a plurality of recording units.

It is still another object of the present invention to provide an improvement in a printing apparatus or system which is capable of printing on recording media of different sizes.

It is still another object of the present invention to provide an improvement in a printing apparatus or system which is capable of printing an image on a recording medium with a multihead.

It is still another object of the present invention to provide an improvement in a printing apparatus or system which is capable of printing by inkjet operations.

It is still another object of the present invention to provide an improvement in a copying machine or system which reads image data on a document, converts the readout data into electric signals, and prints an image on the basis of the electric signals.

The above and the other objects and features of the present invention will become apparent from the following description of the invention when taken in conjunction with the accompanying drawings.

BRIEF DESCRIPTION OF THE DRAWINGS

FIGS. 5A to 5E are views for explaining the image density changing operation by the image density changing circuit shown in FIG. 4;

DETAILED DESCRIPTION OF THE PREFERRED EMBODIMENTS

Figure 1:
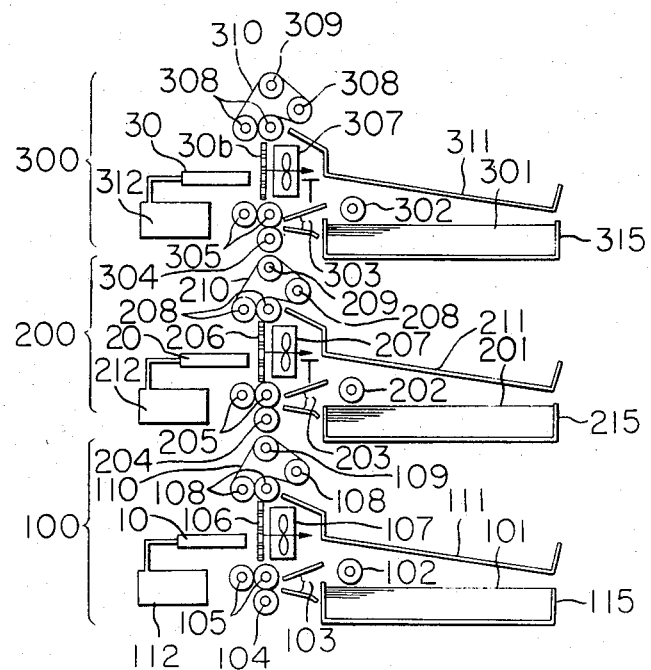
FIG. 1 is a schematic sectional view showing a printing apparatus according to an embodiment of the present invention.

The preferred embodiments of the present invention will now be described with reference to the accompanying drawings. FIG. 1 shows the first embodiment of the present invention, which has a first recording unit 100, a second recording unit 200, and a third recording unit 300. The first through third recording units 100, 200 and 300 have recording heads which are, in the case of this embodiment, inkjet heads 10, 20 and 30. Each inkjet head is of a full-line type wherein a plurality of recording elements (ink nozzles or orifices) are linearly aligned in the direction normal to the plane of the drawing. These inkjet heads 10, 20 and 30 are driven by electric signals from a data source shown in FIGS. 2 and 3 for recording. In the case of this embodiment, the inkjet recording head 10 performs halftone recording according to halftone data involving sixteen gradation densities as will be described later, while the inkjet recording heads 20 and 30 perform normal recording according to binary data. These recording units 100, 200 and 300 are vertically aligned in three steps by supports (not shown). However, these recording units may be incorporated in the form of units and may be separately arranged. The respective recording units only differ from one another in the arrangement for control and are the same in the other mechanisms.

Recording paper sheets 101, 201, and 301 are held in recording paper sheet cassettes 115, 215 and 315. The printing apparatus of this embodiment further has pickup rollers 102, 202 and 302; guide plates 103, 203 and 303; register rollers 104, 204 and 304; first feed rollers 105, 205 and 305; platens 106, 206 and 306 with many small holes; suction fans 107, 207 and 307; second feed rollers 108, 208 and 308; suspension rollers 109, 209 and 309; convey belts 110, 210 and 310; exhaust trays 111, 211 and 311; and ink tanks 112, 212 and 312.

The mode of operation of the printing apparatus of the configuration as described above will be described. Since the recording units 100, 200 and 300 all operate in the same manner, a description will only be made on the first recording unit 100.

The recording paper sheet 101 stored in the cassette 115 is fed to the register roller 104 held in the stationary status along the guide plate 103 upon the rotation of the pickup roller 102 to form a loop. With the rotation of the register roller 104, the recording paper sheet 101 is clamped between the register roller 104 and the first feed rollers 105 to be transferred toward the inkjet head 10. The fan 107 and the platen 106 with small holes oppose the inkjet head 10. Air is blown by the fan 107 in the direction indicated by arrow T in the figure. The recording paper sheet 101 past the first feed rollers 105 is transferred onto the platen 106 toward the second feed rollers 108 while it is absorbed by the fan 107. In accordance with the electric signals from a data source shown in FIGS. 2 and 3, the inkjet head 10 is driven by a driver for recording. When the leading edge of the recording paper sheet 101 reaches the second feed rollers 108 after recording, it is exhausted to the exhaust tray 111 by the second feed rollers 108 and the convey belt 110.

Figure 2:
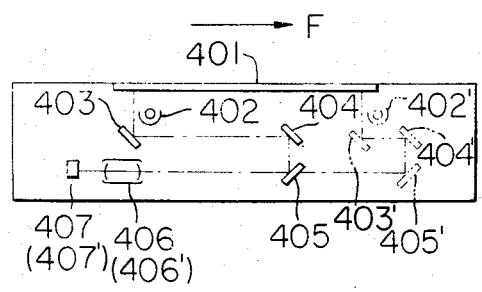
FIG. 2 is a schematic sectional view showing an example of an original readout device.

FIG. 2 is a schematic sectional view of an original readout device at an input section of the printing apparatus shown in FIG. 1, which has an original glass table 401, a rod-shaped light source such as a halogen lamp or a fluorescent lamp, a first mirror 403, a second mirror 404, a third mirror 405, a lens 406, and a one-dimensional solid state image pickup element 407 such as a CCD.

The lenses 406 and 406' and the CCDs 407 and 407' are arranged vertically with respect to the surface of the recording paper sheet. The lens 406 and the CCD 407 constitute one optical system, while the lens 406' and the CCD 407' constitute another optical system. These two optical systems are optically equivalent to each other; one optical system corresponds to half the main scanning line (normal to the plane of the drawing). Therefore, if the output signals from the CCD 407 and 407' are continuously read out, data of the entire length of one main scanning line of the original is obtained.

The mode of operation of the original readout device will be described. The original placed on the original glass table 401 is illuminated by the rod-shaped light source 402. The image of the original is formed on the CCD 407 by the lens 406 through the first mirror 403, the second mirror 404 and the third mirror 405 for scanning (subscanning) the original. The direction of main scanning of the CCD 407 is normal to the plane of the drawing.

The rod-shaped light source 402 and the first mirror 403 are formed integrally with each other by a support (not shown) and are moved in the direction indicated by arrow F on guide rails (not shown) to scan (subscan) the image of the original. The second mirror 404 and the third mirror 405 are integrally supported by a support (not shown) and are moved on guide rails (not shown) in the same direction at a speed ½ the speed of the first mirror 403. The rod-shaped light source 402, the first mirror 403, the second mirror 404, and the third mirror 405 are moved to the positions 402', 403', 404' and 405' indicated by dotted lines. The length of the optical path from the original glass table 401 through the mirrors 403, 404 and 405 to the lens 406 is kept constant. Therefore, if the signals from the light-receiving elements of the CCD 407 are sequentially read out, raster scanning signals of the original are sequentially obtained.

Figure 3:
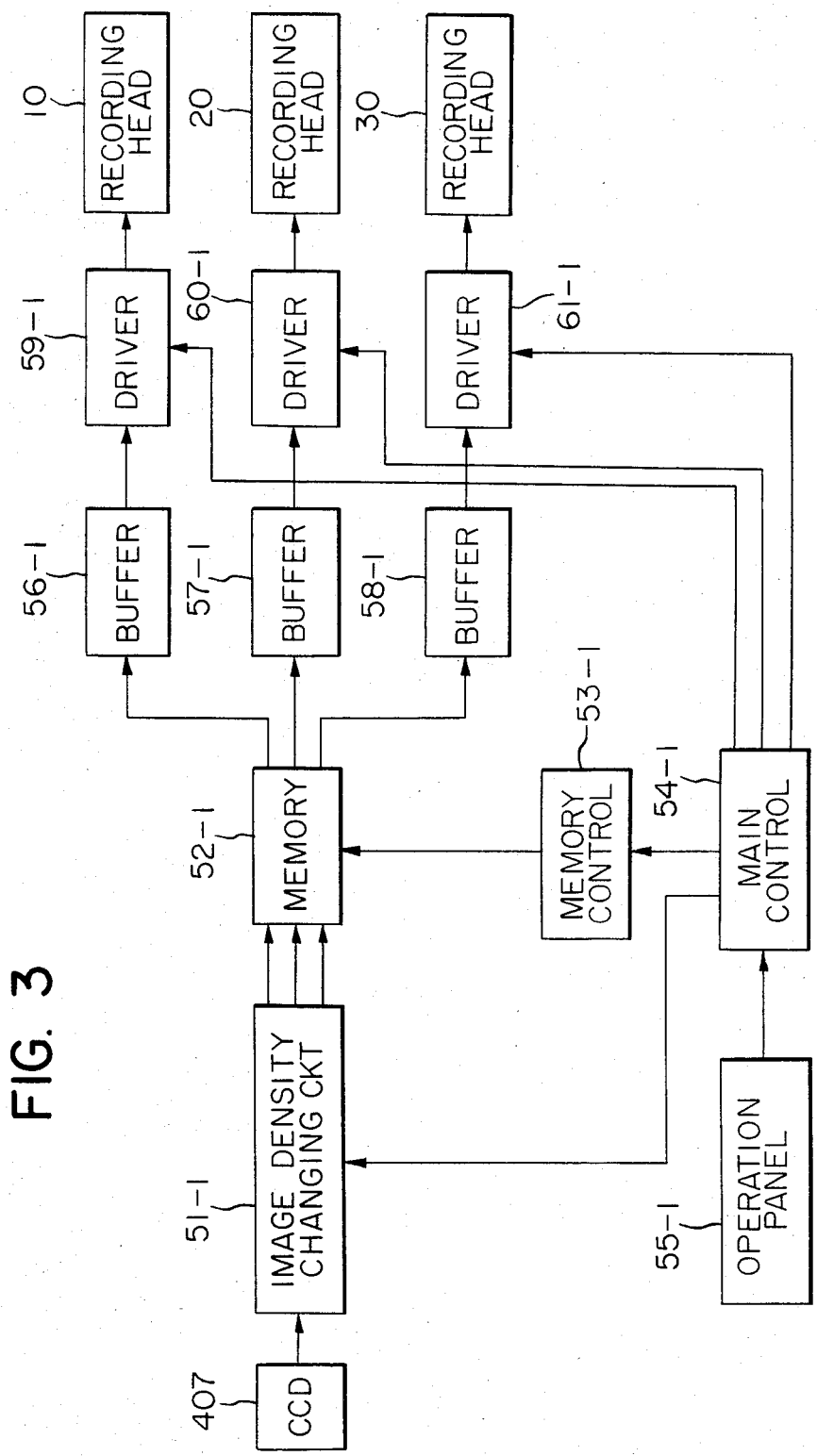
FIG. 3 is a block diagram showing an example of a control system for controlling the recording operation.

FIG. 3 shows an example of control circuitry in the apparatus shown in FIGS. 1 and 2. The same reference numerals as in FIGS. 1 and 2 denote the same parts in FIG. 3. The image data read out by the CCD 407 is supplied to an image density changing circuit 51-1 as shown in detail in FIG. 4. The image density changing circuit 51-1 outputs data having 16 gradation densities and binary data. A memory 52-1 stores the image data output by the image density changing circuit 51-1. The memory 52-1 may comprise a random-access memory or the like. The capacity of the memory 52-1 may be freely selected from the small capacity of a line memory to the big capacity of a page memory. Thus, depending upon the capacity of the memory 52-1 selected, the data of an original may be recorded as the readout operation is performed, or data of an original of one page or several pages may be read out and stored in the memory once and then may be recorded. A memory control 53-1 is controlled by a main control 54-1. Under the control of the main control 54-1, the memory control 53-1 produces an address signal for writing or reading out of data in and from the memory 52-1, a timing signal, a read/write signal and so on. The main control 54-1 performs various control operations according to the key-in (or "setting" or "selection") operation at an operation panel 55-1. Buffers 56-1, 57-1 and 58-1 receive the image data from the memory 52-2 and outputs the same to drivers 59-1, 60-1 and 61-1. The drivers 59-1, 60-1 and 61-1 are turned on or off under the control of the main control 54-1 to drive the inkjet heads 10, 11 and 12.

The mode of operation of each of the recording units 100, 200 and 300 will now be described.

The image data read out by the CCD 407 is supplied to the image density changing circuit 51-1 which produces the binary data and halftone data involving 16 gradation densities by a density change utilizing the 4×4 dither method, for example.

Figure 4:
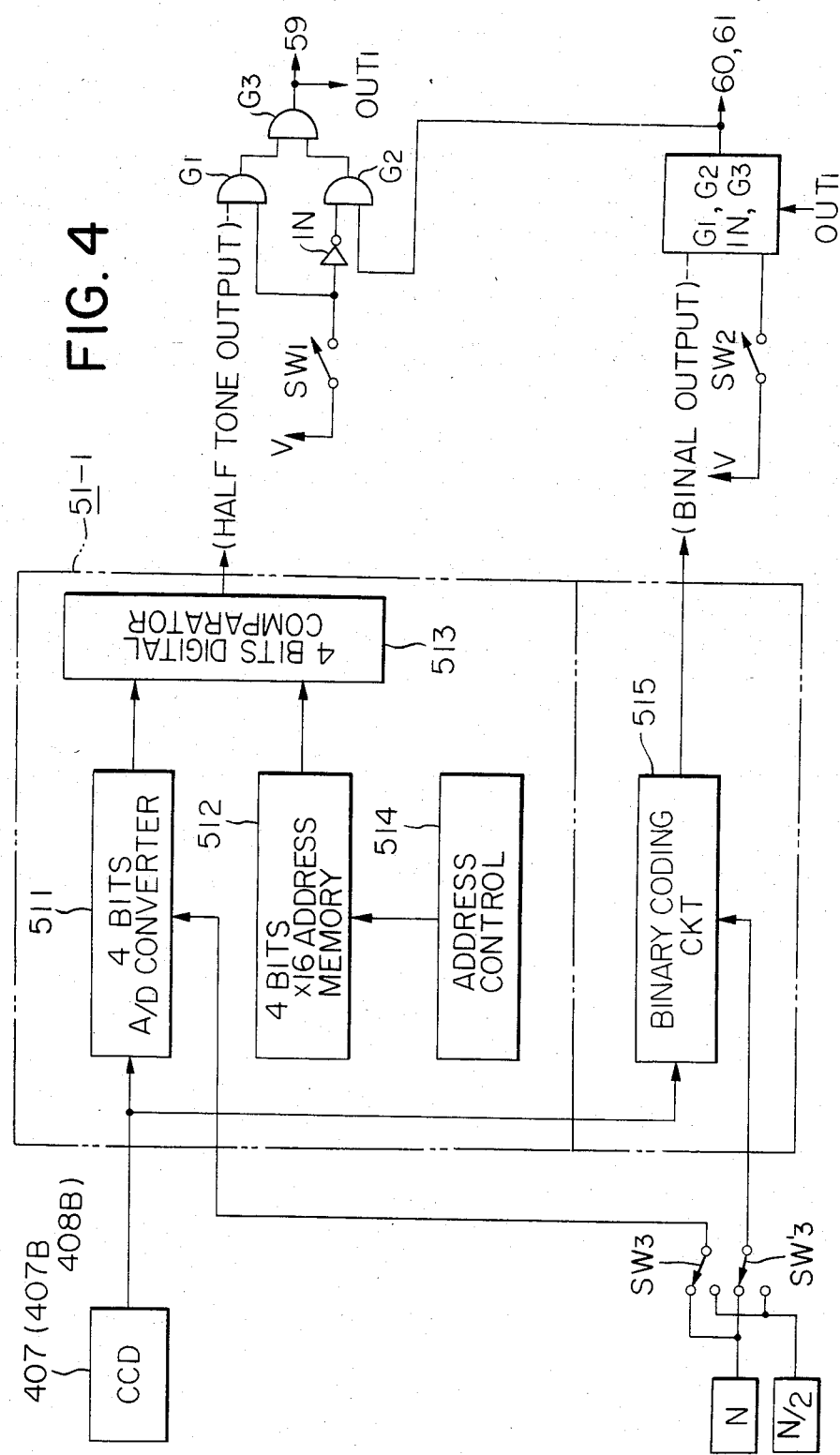
FIG. 4 is a block diagram showing an example of an image density changing circuit.

FIG. 4 shows the configuration of the image density changing circuit 51-1. The case of the halftone data will first be described. A 4-bit analog-to-digital converter (to be referred to as an A/D converter hereinafter) 511 converts the input analog data from the CCD 407 into 4-bit digital data having 16 gradation levels as shown in FIGS. 5A and 5B. A memory 512 has 16 addresses as shown in FIG. 5C. In each of these addresses, different 4-bit image density data are written in advance as shown in FIG. 5D. A 4-bit digital comparator 513 compares the image data supplied from the A/D converter 511 with the image density data supplied from the memory 512 under the control of an address control 514. If the image data is greater than the image density data, the comparator 513 outputs the image data for performing 1-dot recording at a position corresponding to the address. For example, in the example of FIGS. 5A to 5D, 1-dot recording is performed in correspondence with addresses 0, 1 and 3, and 1-dot recording is not performed in correspondence with address 2. Each address thus corresponds to one bit of the CCD 407.

The image data from the CCD 407 is also supplied to a binary encoder 515 of the image density changing circuit 51-1. The binary encoder 515 produces binary data.

The halftone data and binary data obtained by the image density changing circuit 51-1 are supplied to the memory 52-1 to be written therein under the control of the memory control 53-1. As has been described above, the memory 52-1 has a memory capacity corresponding to one page or several pages. The data written in the memory 52-1 is output to the buffers 56-1 to 58-1 under the control of the memory control 53-1. The halftone data is supplied to the buffer 56-1, while the binary data is supplied to the buffers 57-1 and 58-1. Under the control of the control 54-1, one of the drivers 59-1 to 61-1 is driven to bias one of the inkjet heads 10, 20 and 30 for recording. When the inkjet head 10 is energized, halftone recording is performed. When the inkjet head 20 or 30 is energized, normal recording is performed on the basis of the binary data. Therefore, the operator can select one of the inkjet heads 10, 20 and 30 by the key-in operation of the operation panel 55-1 so as to obtain a halftone copy of a normal copy from the same original.

A switch SW1 is for supplying a halftone output to the driver of the inkjet head 10. A switch SW2 is for supplying a binary output to the drivers 60 and 61 of the inkjet heads 20 and 30, respectively. The circuitry further includes AND gates $G_1$ and $G_2$, an OR gate $G_3$ and an inverter IN. A clock N is for obtaining a sampling rate, while a clock N/2 is for obtaining a sampling rate half that of the clock N. Switches SW3 and SW3' are for switching between these clocks so as to select the magnification of the copy in the direction of main scanning in the fine and binary modes. The clock N/2 corresponds to ½ reduction, and the clock N corresponds to reproduction in equal size. When the clock N/2 is selected, the feeding speed of the recording paper sheet is doubled to reduce the magnification ½ in the direction of subscanning. When the switches SW1 and SW2 are turned on, the halftone data and the normal data are simultaneously output to the inkjet heads. When only the switch SW2 is on, the normal data is output to all the inkjet heads. If the AND gate $G_2$ is eliminated, the data is not output to the inkjet head 10 when only the switch SW2 is on.

In accordance with the selection of the switches SW1 to SW3, the inkjet heads 10, 20 and 30 are capable of printing in combining the three modes of halftone mode, binary mode, and magnification change mode.

Figure 23:
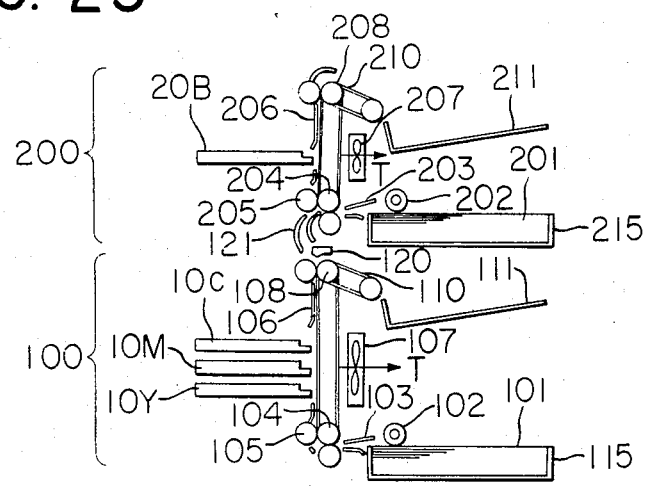
FIG. 23 is a schematic sectional view showing a printing apparatus according to still another embodiment of the present invention.

The principle of the present invention is applicable to a case wherein only one paper feed system is used and a plurality of recording heads is used, or to a case wherein only the recording unit 100 alone, for example, is used as shown in FIG. 23. Similarly, the present invention is applicable to a case wherein a plurality of recording heads is opposed to a single recording paper sheet.

A plurality of copies recorded in different modes may be simultaneously obtained by driving the head drivers and paper feed systems simultaneously.

Printing in the fine mode and the normal mode will now be described.

Referring to FIG. 1, assume that the inkjet head 10 is for fine mode recording of 16 dots/mm density, and the inkjet heads 20 and 30 are for normal mode recording of 8 dots/mm density. The rest of the arrangement remains the same as that shown in FIG. 1, and the original readout device also remains the same as that shown in FIG. 2.

Figure 6:
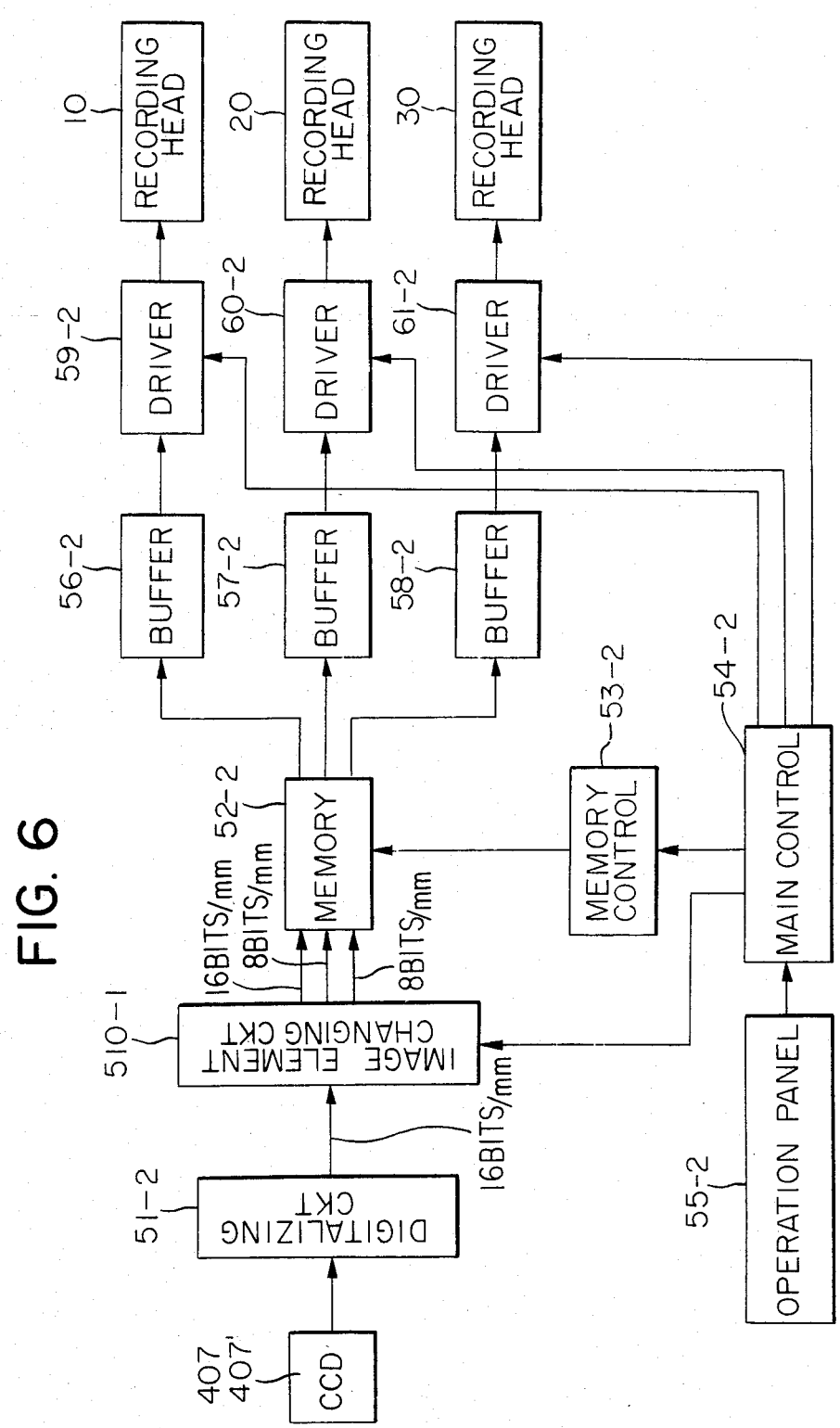
FIG. 6 is a block diagram of another example of a control for controlling the recording operation.

FIG. 6 shows an example of control circuitry. This control circuitry has CCDs 407 and 407' each of 1,728 bits. Since two CCDs read out the image data along the direction of the shorter side of a paper sheet of A4 size (210 mm width), the picture element density for readout is about 16 bits/mm. The image data read out by the CCDs is supplied to a digitizer circuit 51-2 which will be described as a binary encoder hereinafter. The binary data output by the digitizer circuit 51-2 is supplied to a picture element density changing circuit 510-1 as shown in detail in FIG. 7. The picture element density changing circuit 510-1 produces the fine mode data of 16 bits/mm density and the normal mode data of 8 bits/mm density. The image data from the picture element density changing circuit 510-1 is stored in a memory 52-2 which may comprise a random-access memory. The capacity of the memory 52-2 and the like may be the same as those of the memory shown in FIG. 3. The rest of the arrangement is also the same as that shown in FIG. 3.

The mode of the recording operation at each of the recording units 100, 200 and 300 will now be described.

The image data read out by the CCD 407 is supplied to the digitizer circuit 51-2 for conversion into binary data. The binary data of 16 bits/mm density is supplied to the picture element density changing circuit 510-1. After a certain delay time, the picture element density changing circuit 510-1 directly outputs the input data in the form of the fine mode data of 16 bits/mm density while it also outputs the input data in the form of the normal mode data of 8 bits/mm density.

Figure 7:
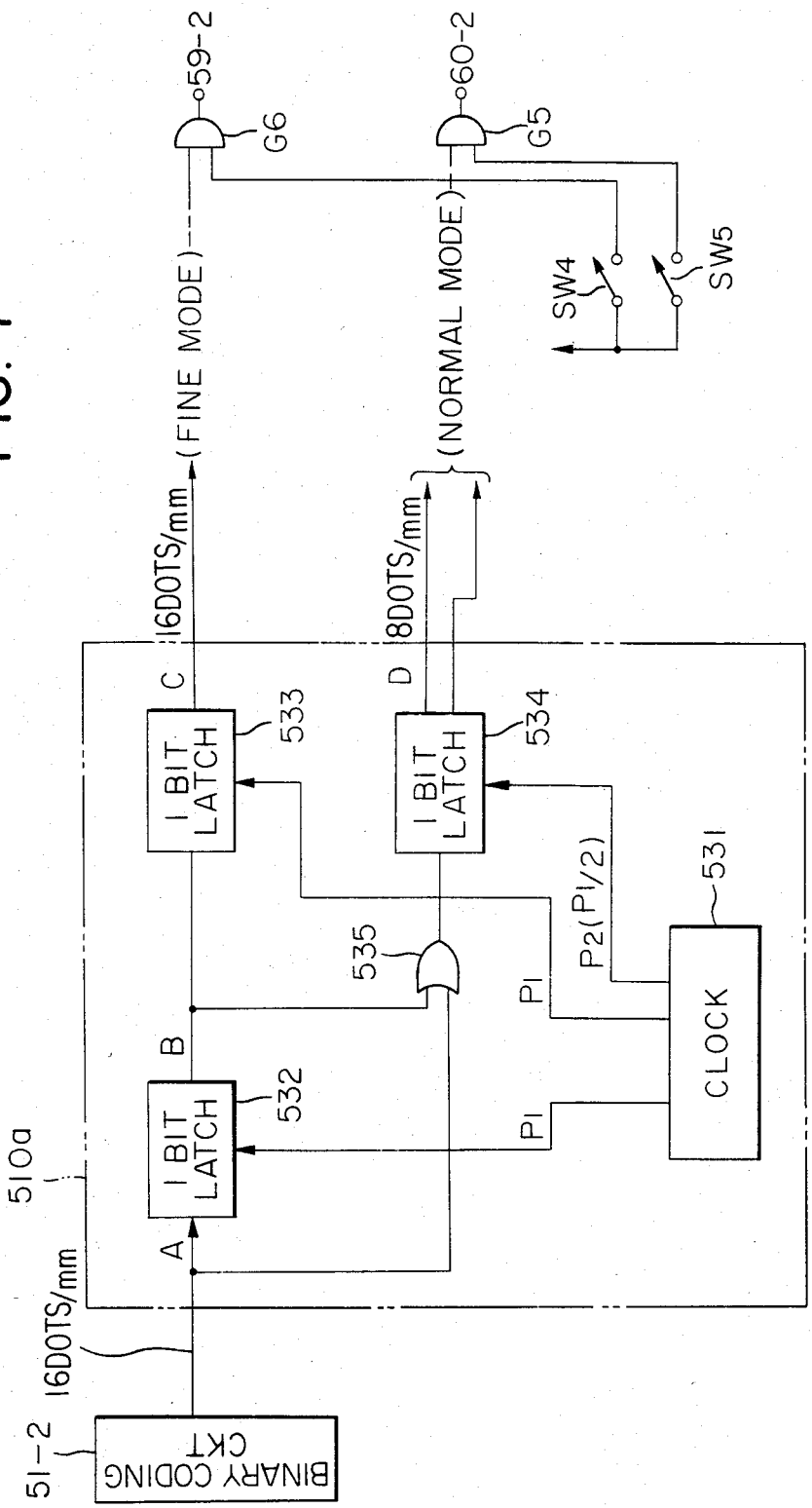
FIG. 7 is a block diagram of a main scanning picture element density changing circuit.
Figure 8:
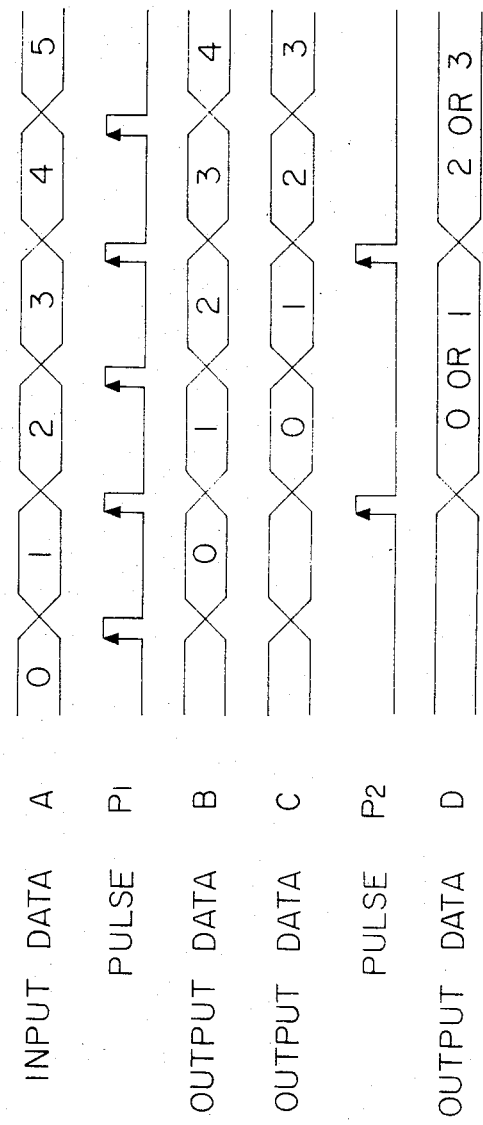
FIG. 8 shows the timing charts for showing the operations at respective parts of the main scanning picture element density changing circuit shown in FIG. 4.

In the main scanning picture element density changing circuit shown in FIG. 7, a clock generator 531 generates pulses P1 corresponding to the number of bits of one line of the CCD and pulses P2 numbering ½ that of the pulses P1. The pulses P1 are supplied to 1-bit latches 532 and 533 while the pulses P2 are supplied to a 1-bit latch 534. In response to these pulses received, the 1-bit latches 532, 533 and 534 latch 1-bit data, respectively. An OR gate 535 receives data of the first bit supplied from the digitizer circuit 51-2 through the 1-bit latch 532 as delayed by one bit and also receives the data of the second bit therefrom. The OR output from the OR gate 535 is supplied to the 1-bit latch 534. FIG. 8 shows the timing charts of input data A to and output data B from the 1-bit latch 532, fine mode output data C from the latch 533, and normal mode output data D from the 1-bit latch 534. In this embodiment of the present invention, the normal mode is established by converting the input data of 16 bits/mm density into image data of 8 bits/mm density by producing image data of level "1" if two adjacent bits are both "1" or one of them is "1" and by producing image data of level "1" if both these bits are "0". The output data from the 1-bit latch 533 is the fine mode image data of 16 bits/mm density obtained by delaying the input data by a duration corresponding to two clocks. In this embodiment, a logical sum (OR) of data of two adjacent bits of input data is obtained for conversion of input data into normal mode data. However, the present invention is not limited to this. For example, a logical product (AND) may alternatively be used or the input data may be sampled at every other bit.

The fine mode data and the normal mode data are supplied to the memory 52-2 to be written therein under the control of a memory control 53-2. Under the control of the memory control 53-2, the memory 52-2 outputs the fine mode data of 16 bits/mm density to a buffer 56-2 and the normal mode data of 8 bits/mm density to buffers 57-2 and 58-2. A main control 54-2 selectively drives at least one of drivers 59-2, 60-2 and 61-2 to thereby energize the corresponding inkjet heads 10, 20 and 30 for recording. In this embodiment, fine mode recording is performed by the inkjet head 10, while normal mode recording is performed with the inkjet heads 20 and 30. By specifying a desired mode by the key-in operation on an operation panel 55-2, recording in either mode or recording of a plurality of recording paper sheets in different modes may be set or selected to be performed. The arrangement for this purpose includes AND gates $G_4$ and $G_5$, and switches SW4 and SW5.

The present invention has been described with reference to the embodiments wherein fine mode recording is performed on the basis of the picture element density changing operation in the direction of main scanning of the CCD 407. However, fine mode recording on the basis of the picture element density changing in the direction of subscanning may be similarly performed by changing the scanning speed of the CCD 407 in the subscanning direction and the recording speed at the corresponding recording unit. This will be described in further detail with reference to the embodiment shown in FIGS. 1 and 2.

In the original readout device shown in FIG. 2, the scanning speed (subscanning) of the original placed on the original glass table 401 can be varied by the operation unit (now shown). In correspondence with the controlled scanning speed, the rollers 102 to 105 shown in FIG. 1 are controlled to control the feeding speed of the recording paper sheet. If the printing speed in the direction of main scanning of the inkjet head 10, 20 or 30 of the recording unit 100, 200 or 300 is held constant, the recording speed in the subscanning direction changes according to the feeding speed of the recording paper sheet fed on the platen 106, 206 or 306. Thus, the picture element density in the subscanning direction may be varied. When the scanning (subscanning) speed of the original at the original readout device is made smaller than that for normal mode recording, the number of scanning lines in the subscanning direction by the CCD 407 increases and more image data is read out. The recording paper sheet is fed at a speed corresponding to the scanning (subscanning) speed, so that a fine mode copy with a higher picture element density in the subscanning direction is produced by the inkjet head 10, 20 or 30.

A change in the picture element density in the subscanning direction may be electrically effected in the main scanning direction.

Figure 9:
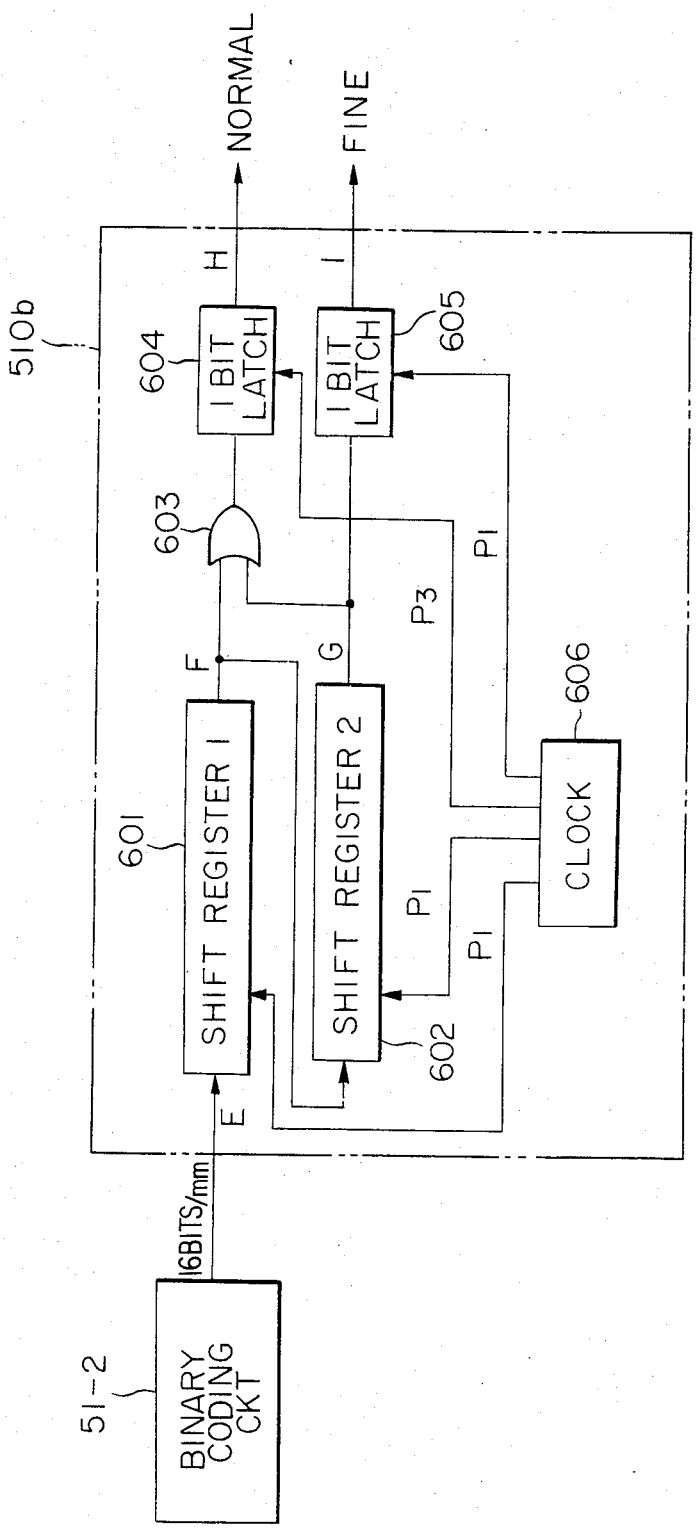
FIG. 9 is a block diagram of a subscanning picture element density changing circuit.

FIG. 9 is a block diagram of a subscanning picture element density changing circuit. The circuit has first and second shift registers 601 and 602 of 3,456 bits, an OR gate 603, 1-bit latches 604 and 605, and a clock generator 606.

Figure 10:
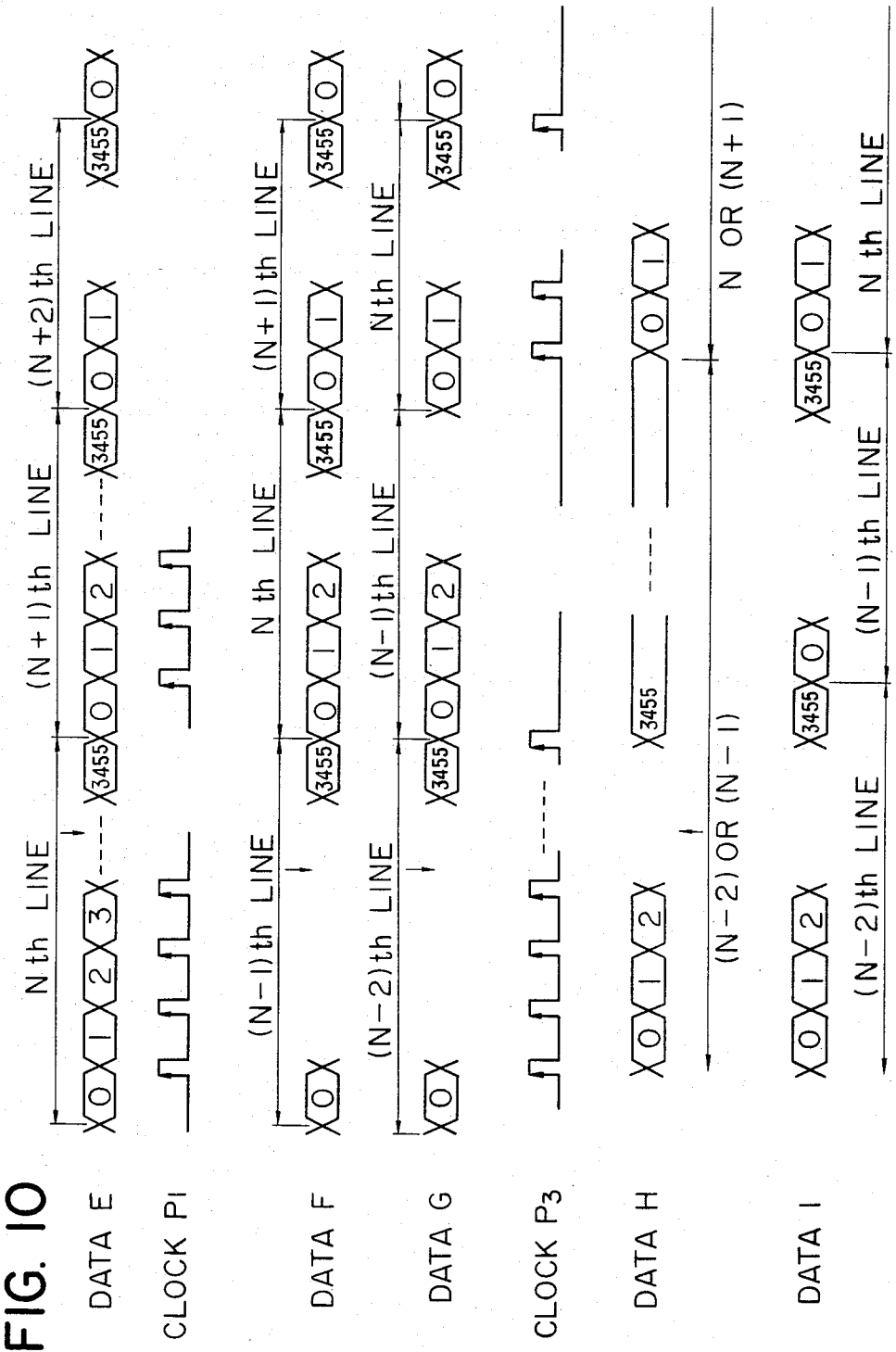
FIG. 10 shows the timing charts for explaining the operations at respective parts of the circuit shown in FIG. 9.

The mode of operation of the subscanning picture element density changing circuit shown in FIG. 9 will be described. The image data of 16 bits/mm density output from the digitizer circuit 51-2 is supplied to the first shift register 601 of 3,456 bits. The number of bits of the shift registers 601 and 602 corresponds to the number of bits of one line of the fine mode data. The output from the first shift register 601 is input to the second shift register 602. The outputs from the first and second shift registers 601 and 602 are input to the OR gate 603. The OR output from the OR gate 603 is stored in the 1-bit latch 604. The output from the second shift register 602 is stored in the 1-bit latch 605. The shift registers 601 and 602 and the 1-bit latches 604 and 605 are controlled by clocks P1 and P3 generated by the clock generator 606. FIG. 10 shows the timing charts of the signals involved in the circuit shown in FIG. 9. The same clock P1 as that shown in FIG. 5 is supplied to the shift registers 601 and 602 and to the 1-bit latch 605. The clock P3 is applied to the 1-bit latch 604 at every scanning line at the same timing as that of the clock P1. A signal H as the normal mode data is obtained for one line on the basis of data of two adjacent lines, such that as shown in FIG. 7, an OR of data at corresponding bit positions of the (N−2)th line and the (N−1)th line or an OR of data at corresponding bit positions of the Nth line and the (n+1)th line is obtained.

Figure 11:
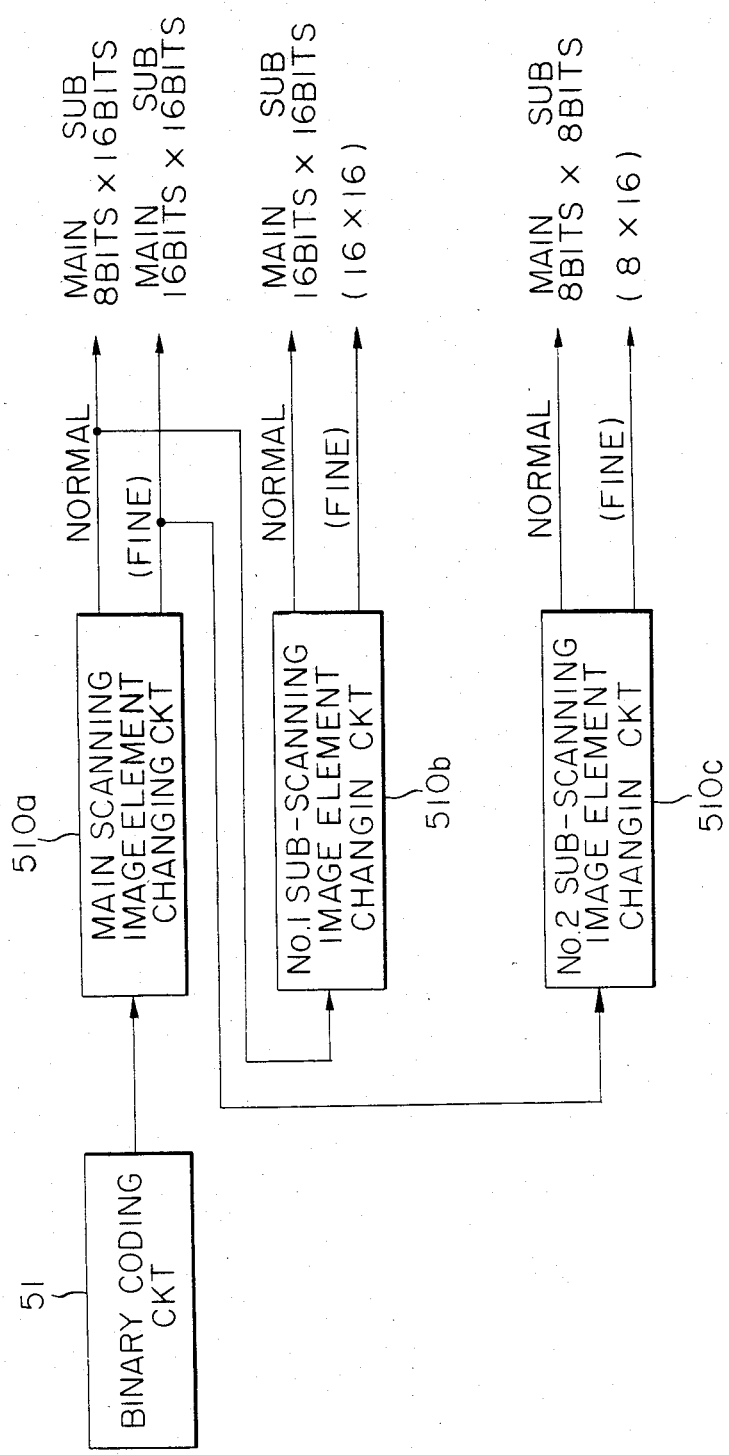
FIG. 11 is a block diagram of an example of a combination of the main scanning and subscanning picture element density changing circuits.

FIG. 11 shows circuitry for performing a picture element density changing operation with a combination of a main scanning picture element density changing circuit 510a as shown in FIG. 7 and a first subscanning picture element density changing circuit 510b as described above. The fine mode data and the normal mode data output from the main scanning picture element density changing circuit 510a are respectively supplied to the first subscanning picture element density changing circuit 510b and a second subscanning picture element density changing circuit 510c. With this arrangement, recording image data of four different picture element densities are obtained through the circuits 510a, 510b and 510c from the data of 16 bits/mm density output by the digitizer circuit 51-2 as below:
(1) Main scanning 16 bits/mm×subscanning 16 bits/mm
(2) Main scanning 16 bits/mm×subscanning 8 bits/mm
(3) Main scanning 8 bits/mm×subscanning 16 bits/mm
(4) Main scanning 8 bits/mm×subscanning 8 bits/mm.
According to this embodiment, normal mode recording and fine mode recording may be freely performed without changing the scanning and recording speeds in the subscanning direction.

A fine mode copy of clear image may be produced by utilizing the picture density changing operations both in the main scanning direction and in the subscanning direction.

The mode of operation of the recording heads will now be described. In an embodiment shown in FIG. 12, the inkjet head 10 is for recording on a recording paper sheet of A3 size, the inkjet head 20 for B4 size, and the inkjet head 30 for A4 size. The detailed structure of each of the inkjet heads 10, 20 and 30 will be described later.

The recording paper sheets 101, 201 and 301 are of A3 size, B4 size and A4 size, respectively, are housed in the recording paper sheet cassettes 115, 215 and 315 of corresponding sizes. Each recording unit can receive a cassette of a particular size. The rest of the arrangement remains the same as that of the embodiment shown in FIG. 1, and the original readout device of this embodiment is the same as that shown in FIG. 2.

Figure 13:
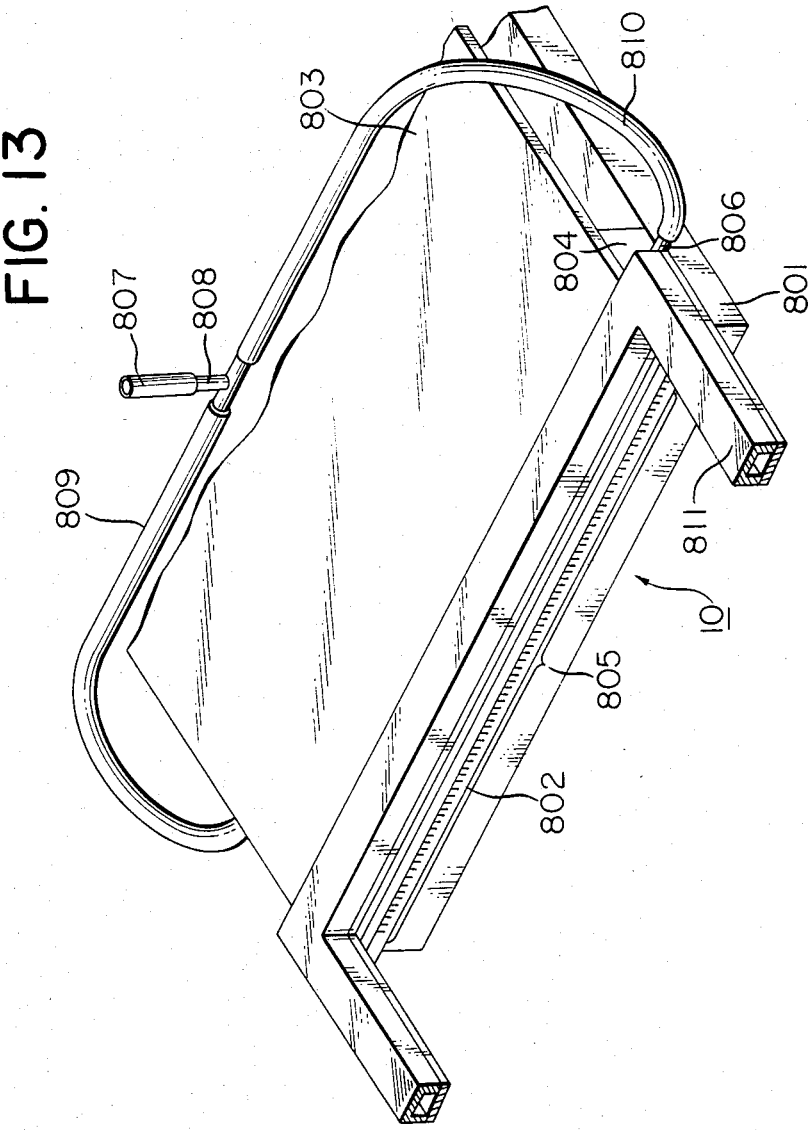
FIG. 13 is a perspective view of an example of a recording head according to the embodiment shown in FIG. 12.

FIG. 13 shows an example of the structure of an inkjet array used for the inkjet heads 10, 20 and 30. An electric current is supplied to a heating section to eject ink by the thermal energy generated. This inkjet head array is used for the inkjet head in each embodiment of the present invention.

In the inkjet head 10 corresponding to the recording paper sheet of A3 size shown in FIG. 13, in order to securely hold the head on a predetermined position of the apparatus main body, a grooved plate block 802 with 2,400 grooves, a grooved lid plate block 803, and a common liquid chamber block 804 are arranged on a support member 801, one end of which is mounted on the apparatus main body. Thus, 2,400 orifices 805 (1,728 in the case of the head 30), 2,400 liquid chambers (1,728 in the case of the head 30) communicating with the orifices, and common liquid chambers communicating with the liquid chambers are defined. The liquid chambers and the common liquid chambers are not shown in FIG. 13. Joint pipes 806 are coupled to ends of the common liquid chambers. The liquid supplied to the common liquid chambers flows to a branch pipe 808 through a supply pipe 807 of an elastic material communicating with the ink tank 112 (FIG. 1). The liquid is thus divided into two directions to flow into the common liquid chambers through supply pipes 809 and 810 of an elastic material, respectively. A heat pipe 811 of U-shape is arranged at a predetermined position on the inkjet head 10. Heat generated by the inkjet head 10 is effectively transmitted by the heat pipe 811 to a radiator which is an element constituting a drying means for drying the recording paper sheet.

In this embodiment, the inkjet head 10 having 2,400 orifices 805 are arranged at the recording unit 100, the inkjet head 20 having 2,080 orifices 805 is arranged at the recording unit 200, and the inkjet head 30 having 1,728 orifices 805 is arranged at the recording unit 300. In this embodiment, eight orifices are included per mm to perform 8 dots/mm recording.

Figure 12:
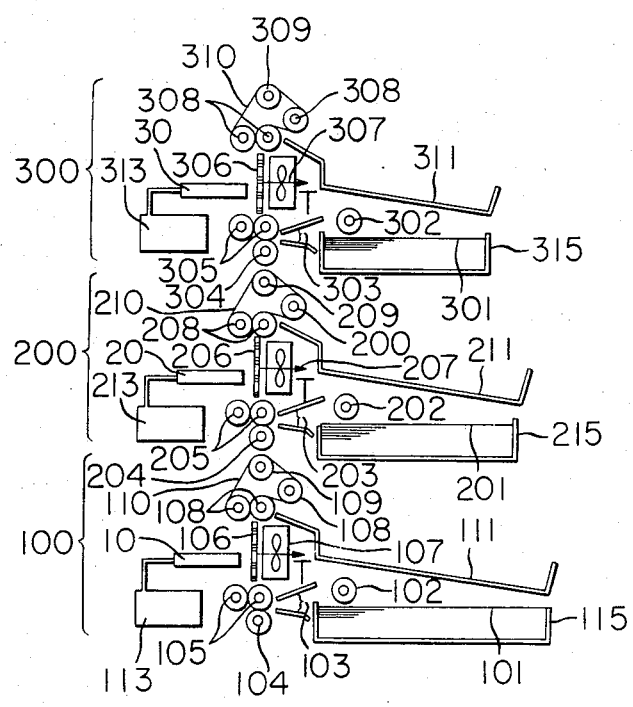
FIG. 12 is a schematic sectional view of a printing apparatus according to another embodiment of the present invention.

The control for the apparatus shown in FIG. 12 is the same as that shown in FIG. 3 or FIG. 6. The image density changing circuit 51-1 may be replaced by the digitizer circuit 51-2 shown in FIG. 6.

When a recording paper sheet size specifying key (not shown) on an operation panel is depressed to select a recording paper sheet of a particular size, the corresponding recording unit is driven to perform desired printing.

Figure 14:
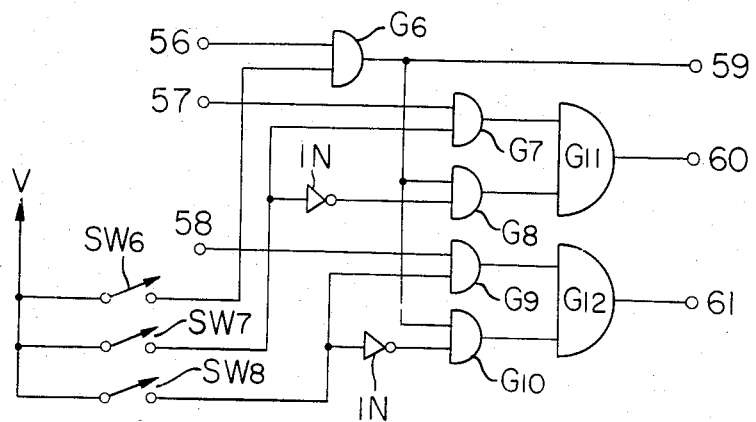
FIGS. 14 and 15 are circuit diagrams of parts of a control according to the embodiment shown in FIG. 12.

This may be achieved with the circuit shown in FIG. 14. When a small size latch switch SW6 is turned on by a key-in operation of a small size key, the image output of small size is supplied to a driver 59. When an intermediate size switch SW7 or a big size switch SW8 is turned on, image output of the corresponding size is supplied to a predetermined driver.

If the intermediate size switch SW7 and the big size switch SW8 are not on, the image output of small size may be supplied to all of the drivers 59 to 61 so as to produce the desired number of copies of the desired size faster.

In this embodiment, inkjet heads 10, 20 and 30 of three different line widths are used. However, the combination of the line widths is not limited to this example. Furthermore, the cassettes 115, 215 and 315 incorporated in correspondence with the inkjet heads 10, 20 and 30, respectively, may be arranged at a single place and the recording paper sheet may be transferred to the desired recording unit. In the embodiment described above, one inkjet head is incorporated for each of the recording units 100, 200 and 300. However, a plurality of inkjet heads of different line widths may be incorporated for each recording unit. In this case, the inkjet head corresponding to the size of the fed recording paper sheet may be driven for recording.

Figure 15:
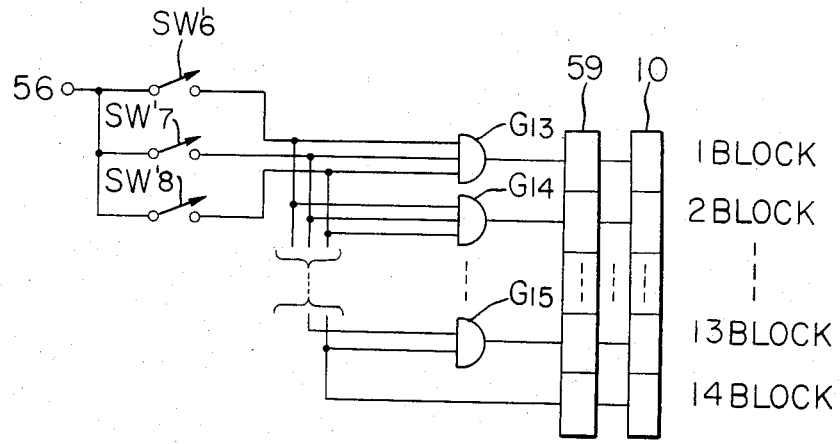

Alternatively, it is possible to select the block of one inkjet head 10 in accordance with a size signal. FIG. 15 shows an example of a circuit for achieving this, wherein the head 10 has 14 blocks each having 128 ink nozzles. Each nozzle forms a dote for forming an image. When a big size switch SW8' is on, all the 14 blocks of the head are enabled. When an intermediate size switch SW7' is on, the 14th block is disabled. When a small size switch SW6' is on, the 13th and 14th blocks are disabled. Therefore, even if the size of the image output data is greater than the size of the recording paper sheet fed, only the head blocks corresponding to the size of the recording paper sheet are enabled, so that the convey belt may not be dirtied with ink. The outputs from buffers 56, 57 and 58 may be supplied to the respective blocks in the manner as described above. The switches SW6' to SW8' may be signals generated upon key-in operations on the operation panel, or the signals from the size sensors of the cassettes 115, 215 and 315 or signals from the width sensors of the recording paper sheets 101, 201 and 301. The former may be obtained by cam switches which are turned on upon mounting of the cassettes, and the latter may be obtained from a plurality of sensors arranged in the direction of width of the sheet along the feed path of the recording paper sheet. If a number of switches SW6' to SW8' are arranged on the operation panel in correspondence with the number of blocks, the formation of white part of the printed image is easy. In this embodiment, size control may be performed by the output from the driver 59 or by image data output from the memory. The driver 59 is divided in correspondence with the blocks of the head. OR gates $G_{13}$ to $G_{15}$ drive the driver 59. It is not only possible to select blocks according to the size of the recording paper sheet but also possible to select the nozzles for output control.

This embodiment is extremely advantageous for recording when the size of the original differs from that of the recording paper sheet. For example, for recording on a recording paper sheet of small size, the inkjet head of small line width corresponding to the size of the sheet need only be driven or corresponding blocks need only be selected, thus providing a printing apparatus which is economical and which is clean.

A still another embodiment of the present invention will now be described which allows combinations of various recording modes.

Figure 16:
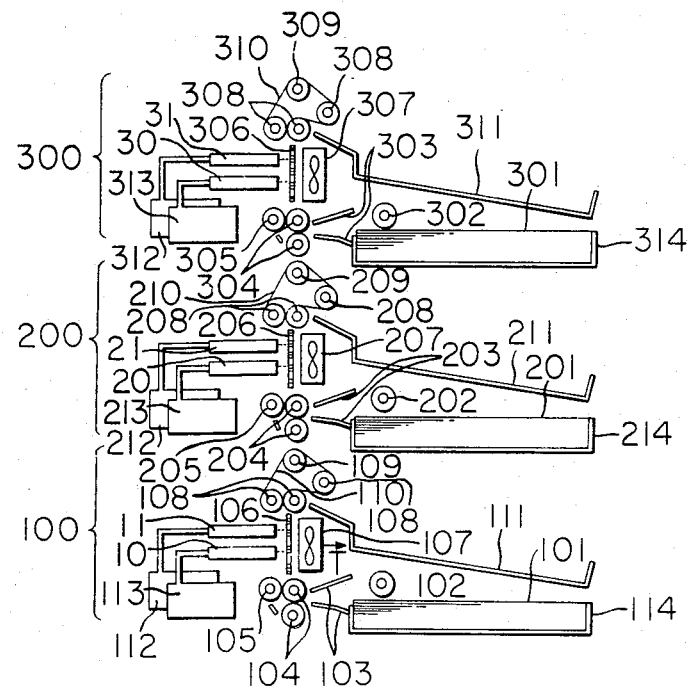
FIG. 16 is a schematic sectional view showing a printing apparatus according to still another embodiment of the present invention.

FIG. 16 shows this embodiment. Each recording unit as shown in FIG. 1 has two inkjet heads 10 and 11, 20 and 21, and 30 and 31, respectively. Each inkjet head is a full-line type inkjet head wherein a plurality of recording elements are aligned in the direction normal to the plane of the drawing. The inkjet head is driven in accordance with the electric signals from a data source (not shown). In this embodiment, the inkjet heads 10, 20 and 30 perform black normal mode recording of 8 dots/mm density. The inkjet head 11 performs black fine mode recording of 16 dots/mm density. The inkjet head 21 performs black halftone mode recording of 16 dots/mm density. The inkjet head 31 performs red normal mode recording of 8 dots/mm density. The rest of the arrangement is the same as that shown in FIG. 1.

Figure 17:
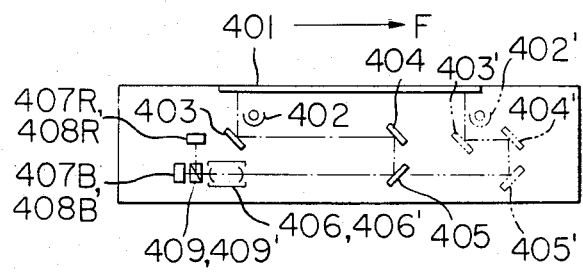
FIG. 17 is a schematic sectional view showing an original readout device of the apparatus shown in FIG. 16.

FIG. 17 shows an original readout device of the apparatus shown in FIG. 16. The original readout device has beam splitters. Color separation beam splitters 409 and 409' are arranged in correspondence with lenses 406 and 406'. These color separation beam splitters 409 and 409' each have spectral characteristics for transmitting light of long wavelength and short wavelength. One-dimensional solid state image pickup elements 407R and 407B, and 408R and 408B which comprises CCDs, for example, are arranged in corespondence with the beam splitters 409 and 409', respectively. For printing in black at the recording units 100 and 200, the image data read out by the CCDs 407B and 408B for sensing light of short wavelength is used. For recording in red at the recording unit 300, the image data read out by the CCDs 407B and 408B and the CCDs 407R and 408R for sensing light of long wavelength is used.

The lens 406, the beam splitter 409, and the CCDs 407R and 407B constitute one optical system. The lens 406', the beam splitter 409', and the CCDs 408R and 408B constitute another optical system. These two optical systems are optically equivalent; one optical system reads out image data of half the scanning line (main scanning; in the direction normal to the plane of FIG. 2) of the original. Therefore, if the output image signals from the CCDs are sequentially read out, the data of entire length of the original in the main scanning direction may be obtained.

Figure 18B:
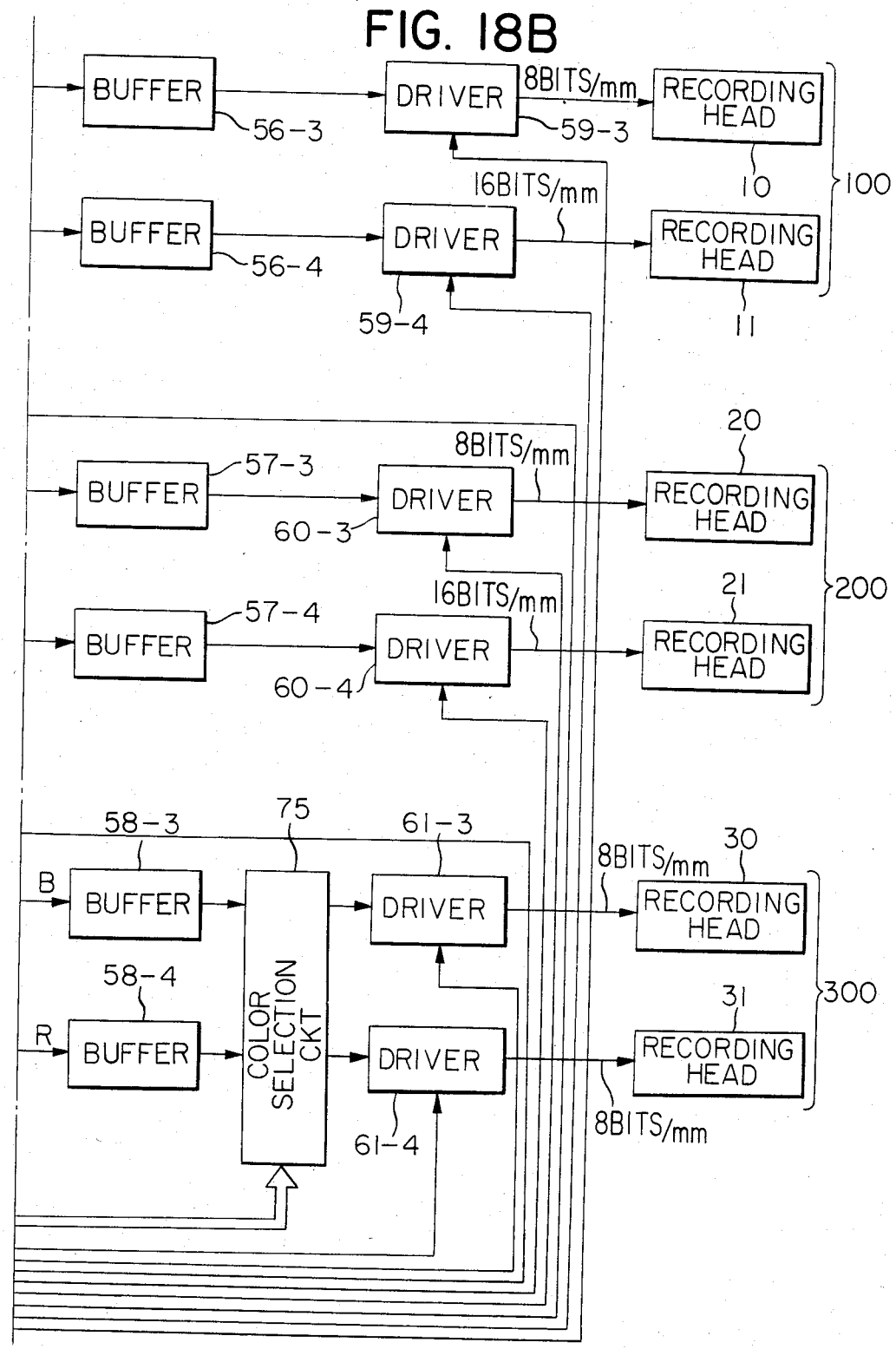
FIG. 18 composed of FIGS. 18A and 18B are block diagrams showing an example of a control of the apparatus shown in FIG. 16.
Figure 19:
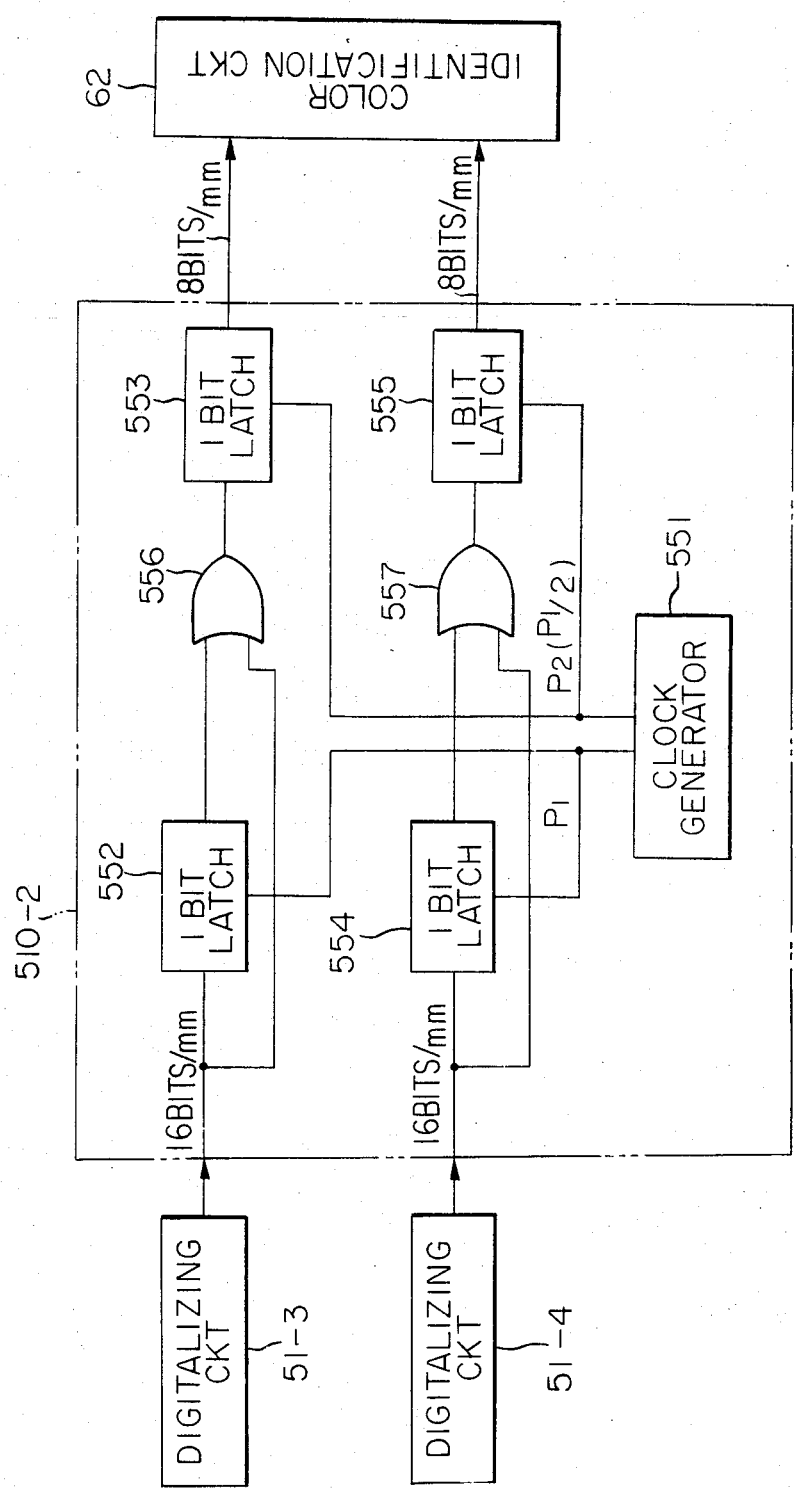
FIG. 19 is a block diagram showing an example of a picture element density changing circuit 55 shown in FIG. 18.
Figure 20:
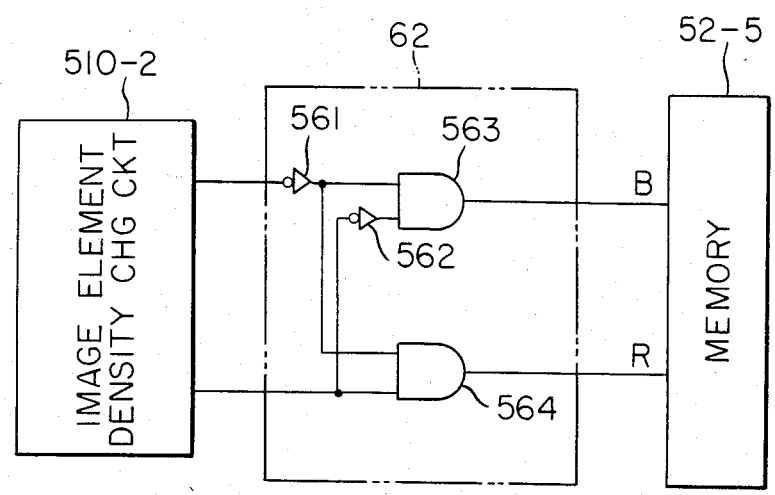
FIG. 20 is a block diagram of a color identification circuit 56 shown in FIG. 3.

The mode of readout operation of the original is the same as that described with reference to FIG. 2. FIG. 18 shows a block diagram of control circuit for the apparatus shown in FIG. 16. The CCDs 407B, 408B, 407R and 408R are of 728 bit configuration. Since the data in the direction of shorter side (210 mm width) of a recording paper sheet of A4 size is read out by two CCDs, the picture element density of readout data is about 16 bits/mm. The CCDs 407B and 408B sense light of short wavelength, while the CCDs 407R and 408R sense light of long wavelength. Digitizer circuits 51-3 and 51-4 convert the image data received from the CCDs into digital image data. The digitizer circuits 51-3 and 51-4 will be described as binary encoders in this embodiment. An image picture element density changing circuit 510-1 is similar to that shown in FIG. 7. The image picture element density changing circuit 510-1 produces the fine mode data of 16 bits/mm density and the normal mode data of 8 bits/mm density. The image density changing circuit 51-1 receives the image data read out by the CCDs 407B and 408B and produces the image data having 16 gradation densities. FIG. 19 shows the details of a picture element density changing circuit 510-2 which receives the image data of 16 bits/mm density and produces the image data of 8 bits/mm density. FIG. 20 shows the details of a color identification circuit 62 which receives the image data of 8 bits/mm density from the picture element density changing circuit 510-2 and produces a black signal B and a red signal R.

Memories 52-3, 52-4 and 52-5 store the image data output from the picture element density changing circuit 510-1, the image density changing circuit 51-1, and the color identification circuit 62. These memories may comprise random-access memories. The capacities of these memories may be freely selected from the small capacity of a line memory or the like to the large capacity of a page memory or the like. Depending upon the capacities of the memories selected, it is possible to record while reading out the image data from the original or it is possible to read out the image data for one or several pages and to store the image data in the memories once which will then be read out for recording. Memory controls 53-3 to 53-5 are controlled under the control of a main control 54-3. Under the control of the main control 54-3, the memory controls 53-3 to 53-5 produce an address signal, a timing signal, and a read/write signal for readout or writing operation from or in the memories. Upon key-operations at an operation panel 55-3, the main control performs various controls. The image data from buffers 56-3, 56-4, 57-3, and 57-4 are supplied to drivers 59-3, 59-4, 60-3 and 60-4. The drivers are turned on or off under the control of the main control 54-3 for driving the inkjet heads 10, 11, 20 and 21. FIG. 20 also shows the details of a color selection circuit 75 which selects the color for recording. The signals selected by the color selection circuit 75 are supplied to drivers 61-3 and 61-4. The drivers 61-3 and 61-4 are turned on or off to drive one of the inkjet head 30 or 31.

The mode of recording operation at each of the recording units 100, 200 and 300 of this embodiment will now be described.

(1) Recording unit 100: Black normal mode recording (8 dots/mm density) and black fine mode recording (16 dots/mm density)

The data read out by the CCDs 407B and 408B is supplied to the digitizer circuit 51-3 which outputs the binary image data. The binary image data of 16 bits/mm density is supplied to the picture element density changing circuit 510-1 shown in FIG. 7. After a certain delay time, the image data is output from the picture element density changing circuit 510-1 in the form of fine mode data of 16 bits/mm density. Meanwhile, the picture element density changing circuit 510-1 also outputs the image data in the form of normal mode data of 8 bits/mm density. The image data of 16 bits/mm density and 8 bits/mm density are written in the memories in the manner described with reference to FIG. 6 and are output through the buffers. The main control 54-3 drives one of the drivers 59-3 and 59-4 to energize one of the inkjet heads 10 and 11 for recording. In this embodiment, one mode is selected by the key-in operation on the operation panel 55-3. Thus, if the user selects the black fine mode, the driver 59-4 is driven to thereby energize the head 11 for performing black fine mode recording of 16 dots/mm density. On the other hand, if the user selects the black normal mode, the driver 59-3 is driven to thereby energize the head 10 for performing the black normal mode recording of 8 dots/mm density.

(2) Recording unit 200: Black normal mode recording (8 dots/mm density) and black fine halftone mode recording (16 dots/mm density)

The image data of 16 bits/mm density read out by the CCDs 407B and 408B is supplied to the image density changing circuit 51-1 shown in FIG. 4 which adopts the 4×4 dither method, for example. The image density changing circuit 51-1 produces the halftone image data of 16 gradation densities.

The black halftone fine mode data from the image density changing circuit 51-1 and the black normal mode data from the picture element density changing circuit 510-1 are supplied to the memory 52-4 to written therein. The data stored in the memory 52-4 is supplied to the drivers 60-3 and 60-4 through buffers 57-3 and 57-4. Upon the key-in operation at the operation panel 5-3 by the user, the head corresponding to the selected mode is driven to perform recording in the desired mode. The inkjet head 20 performs black normal mode recording of 8 dots/mm density while the head 21 performs black pseudohalftone fine mode recording of 16 dots/mm density.

(3) Recording unit 300: Black normal recording (8 dots/mm density) and red normal mode recording (8 dots/mm density)

The image data of 16 bits/mm density read out by the CCDs 407B, 408B, 407R and 408R is supplied to the digitizer circuits 51-3 and 51-4. The binary data from these digitizer circuits 51-3 and 51-4 is supplied to the picture element density changing circuit 510-2 which produces the image data of 8 bits/mm density. This image data is supplied to the color identification circuit 62 shown in FIG. 20 which produces the red data and black data of 8 bits/mm density. A clock generator 551 generates the pulses P1 numbering the same as the number of bits of one line of the CCD and the pulses P2 numbering ½ that of the pulses P1. The pulses P1 are supplied to 1-bit latches 552 and 554, while the pulses P2 are supplied to 1-bit latches 553 and 555. These 1-bit latches respectively latch one bit of the input data in response to these pulses P1 and P2. OR gates 556 and 557 receive the data of the first bits from the CCD which are supplied as delayed by one bit from the digitizer circuits 51-3 and 51-4 through the 1-bit latches 552 and 554, and the data of the second bit supplied directly from the digitizer circuits 51-3 and 51-4. The outputs from the OR gates 556 and 557 are supplied to the 1-bit latches 553 and 555. Therefore, in the same manner as described with reference to FIGS. 7 and 8, the image data of 16 bits/mm density and the image data of 8 bits/mm density are obtained. The image data thus obtained corresponding to the CCDs 407B, 408B, 407R, and 408R are supplied to the color identification circuit 62.

Color identification is performed in this embodiment in the manner to be described below. As shown in Table 1 below, since the CCDs 407B and 408B sense light of short wavelength, they are sensitive to white background (no image data) and are not sensitive to black and red portions of the original. On the other hand, since the CCDs 407R and 408R sense light of long wavelength, they are sensitive to white background and red portions of the original and are not sensitive to black portions of the original. Therefore, if all the CCDs 407B, 408B, 407R and 408R produce outputs, the original is white background. If none of the CCDs produces an output, the original is a black original. If the CCDs 407B and 408B do not produce outputs and the CCDs 407R and 408R produce outputs, the original is a red original.

TABLE 1

|  | Black original | Red original | White background |
|---|---|---|---|
| CCD1 (short wavelength) | No output | No output | Output produced |
| CCD2 (long wavelength) | No output | Output produced | Output produced |

Therefore, the color identification circuit 62 may be of the configuration as shown in FIG. 20. The color identification circuit 62 has inverters 561 and 562 and AND gates 563 and 564. When the CCDs 407B, 408B, 407R and 408R sense light, the digitizer circuits 51-2 and 51-4 produce outputs of high level, "H". If and only if the levels of the outputs from the digitizer circuits 51-2 and 51-4 are both at low level, "L", the AND gate 563 produces an output of level "H" to obtain a black signal B. If the output from the digitizer circuit 51-2 is at level "L" and the output from the digitizer circuit 51-4 is at level "H", the AND gate 564 produces an output of level "H" to obtain a red signal R.

Figure 21:
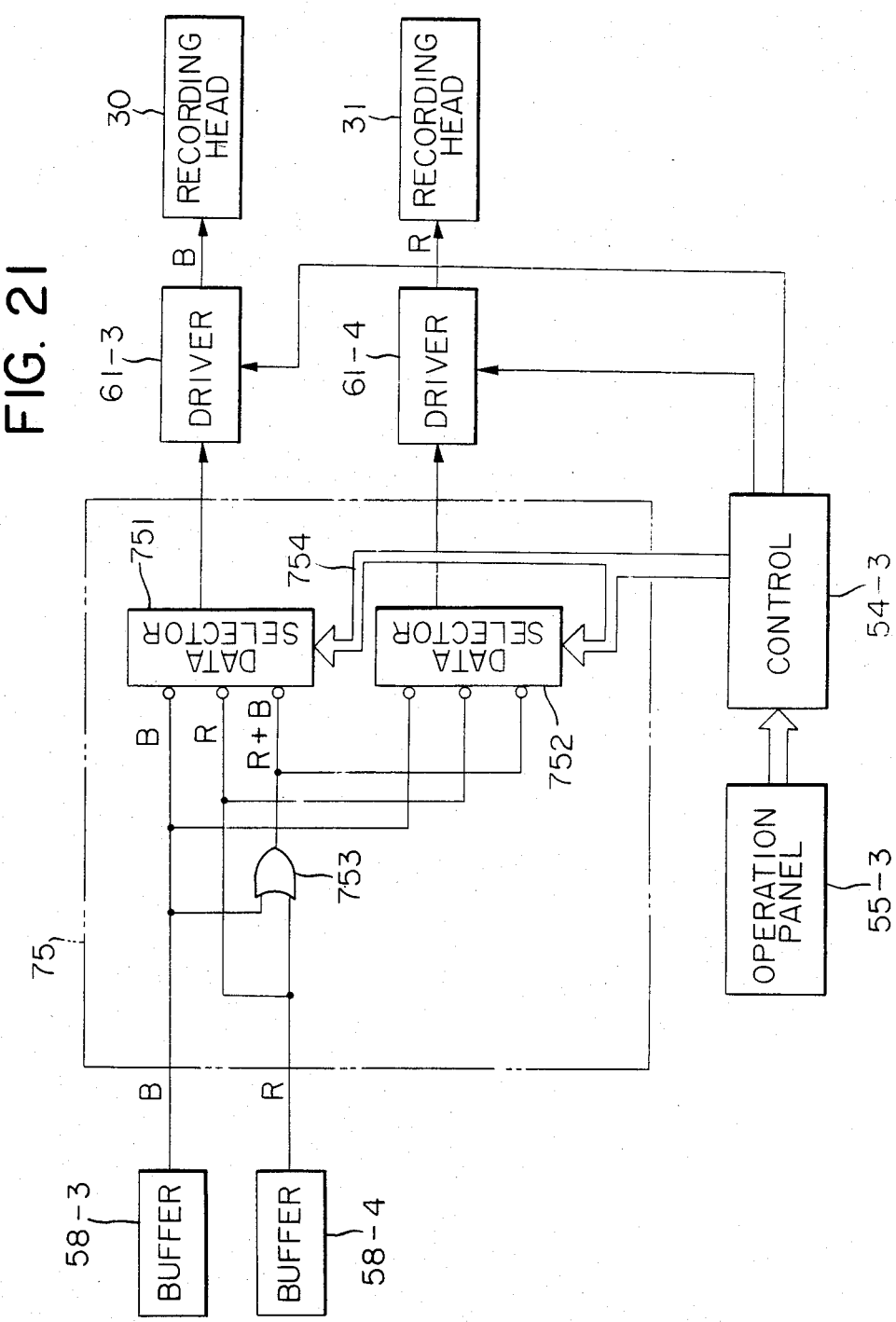
FIG. 21 is a block diagram showing an example of a color selection circuit 75 shown in FIG. 3.

The black signal B and the red signal R are supplied to a memory 52-5. The signals R and B are read out from the memory 52-5 and are supplied to the color selection circuit 75 through buffers 58-3 and 58-4. Referring to FIG. 21, a data selector 751 is incorporated for a black recording head 30, a data selector 752 is incorporated for a red recording head 31, and an OR gate 753 produces an OR of the signals B and R. If the corresponding keys on the operation panel are operated to record all the data in the black normal mode, a control signal is supplied from the main control to the data selector 751 through a bus line 754 to select an R+B port of the data selector 751. Then, a driver 61-3 is turned on, while a driver 61-4 is turned off. Thus, even if the original is printed in two colors, black and red, all the image data is recorded in the black normal mode at a density of 8 dots/mm. In order to record the same original in red normal mode, an R+B port of the data selector 752 is selected to turn off the driver 61-3 and to turn on the driver 61-4. In order to record the red portion alone of the original in red, an R port of the data selector 752 is selected to turn off the driver 61-3 and to turn on the driver 61-4. Other recording modes may be established in a similar manner.

In this manner, all the recording units 100, 200 and 300 have a common function of the black normal mode recording and functions of different recording modes. The mode of recording at each of these recording units 100, 200 and 300 may be selected by the key-in operation at the operation panel. For example, it is possible to simultaneously record by all these recording units an original of red and black in the black normal mode. It is also possible to, with the same original, record in the black fine mode at the recording unit 100, in the black halftone mode at the recording unit 200, and in the red normal mode at the recording unit 300.

Still another embodiment of the present invention will now be described. This embodiment is basically the same as that shown in FIG. 16. However, the inkjet heads 10, 20 and 30 record on a recording paper sheet of A4 size in the black normal mode. The inkjet heads 11, 21, and 31 record on the recording paper sheets of A3, B4 and B5 sizes, respectively, in the black normal mode. The rest of the arrangement is the same as that shown in FIG. 16 except for part of the control circuitry.

Figure 22:
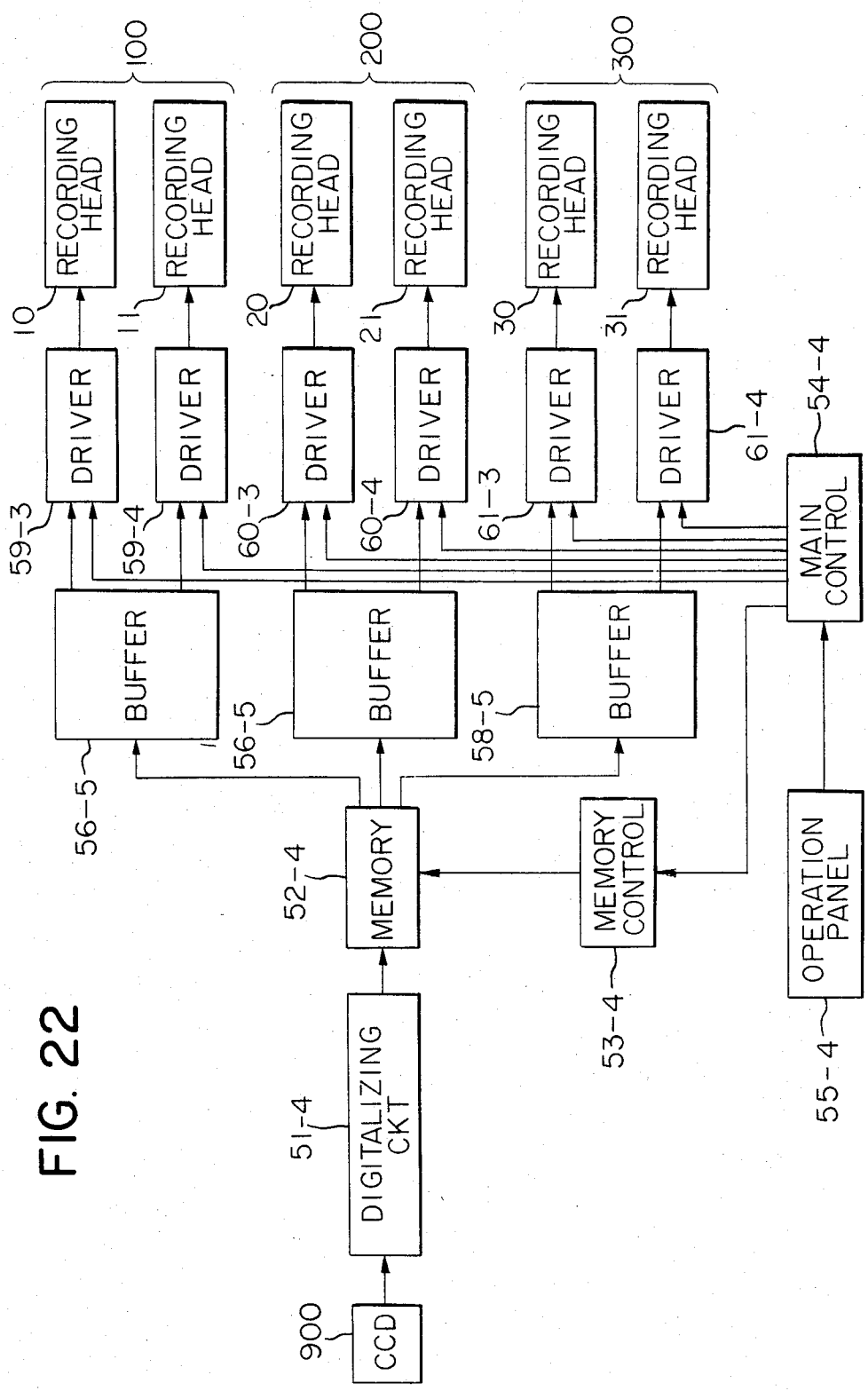
FIG. 22 is a block diagram of another example of a control.

FIG. 22 shows control circuitry of the apparatus of this embodiment. A CCD 900 (one-dimensional solid state image pickup element) has 2,400 image readout elements in correspondence with the inkjet head having the largest number of orifices 805. The control circuitry shown in FIG. 22 operates basically in the same manner as that shown in FIG. 18. However, in this embodiment, the image data of 8 dots/mm density read out by the CCD 900 is digitized and stored in the memory 52-4. Under the control of a main control 54-4, the inkjet heads 10, 11, 20, 21, 30 and 31 perform recording in accordance with the available image data. In this embodiment, cassettes 114, 214 and 314 may be exchanged in accordance with the size of the recording paper sheet to be recorded. Alternatively, two cassettes may be incorporated for each of the recording units 100, 200 and 300 so that the recording paper sheet of a desired size may be supplied from the corresponding cassette according to the selected mode.

Still another embodiment of the present invention for color printing will now be described.

FIG. 23 is a schematic view of a recording apparatus of this embodiment. The recording apparatus has the first recording unit 100 and the second recording unit 200. The first recording unit 100 has three inkjet heads 10Y, 10M and 10C for recording in yellow Y, magenta M and cyan C. The second recording unit 200 has one inkjet head 20B for recording in black. These recording units 100 and 200 are vertically aligned by a support (not shown).

A separator 120 switches the feed path of the recording paper sheet. A communicating guide 121 as an auxiliary feed path communicates the first and second recording units 100 and 200. According to the operation of the separator 120, the recording paper sheet 101 is exhausted to the exhaust tray 111 or is exhausted to the exhaust tray 211 through the second recording unit 200. The platen 106 with small holes and the suction fan 107 oppose the inkjet heads 10Y, 10M and 10C. The rest of the arrangement remains the same as that of the recording units 100 and 200 shown in FIGS. 1 and 16.

The inkjet heads 10Y, 10M and 10C are full-line inkjet heads wherein a plurality of recording elements are aligned in the direction normal to the plane of drawing. In accordance with the electric signals from a data source (not shown), these inkjet heads are driven through drivers for recording. In the case of recording only at the recording unit 100, when the leading end of the recording paper sheet reaches the second feed roller 108 after recording, the recording paper sheet is exhausted to the exhaust tray 111 by the second feed rollers 108 and the convey belt 110.

Figure 24:
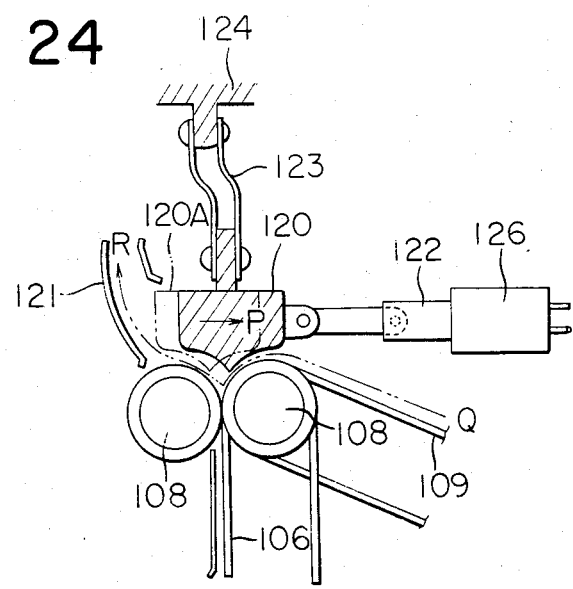
FIG. 24 is a detailed sectional view of a switch device of a separator for switching the recording paper sheet feed paths.

FIG. 24 shows a switch device for switching the feed path of the recording paper sheets according to the present invention. The switch device has the convey belt 106, the second feed rollers 108, an exhaust belt 119, the separator 120, a communication guide 121, and a plunger 126. A link 122 connects the separator 120 with the plunger 126. Parallel leaf springs 123 are coupled between a box body 124 and the separator 120. When the plunger 126 is off, the parallel leaf springs 123 act to locate the separator 120 at a position indicated by alternate long and two short dashed lines 120A in FIG. 24. Under this condition, the recording paper sheet fed from below by the convey belt 106 is fed by the separator 120 to the direction Q, that is, toward the exhaust tray 111 of the first recording unit 100. On the other hand, when the plunger 126 is on, the separator 120 is displaced in the direction shown by arrow P, and the recording paper sheet is fed in the direction shown by arrow R, that is, toward the second recording unit 200.

Figure 25:
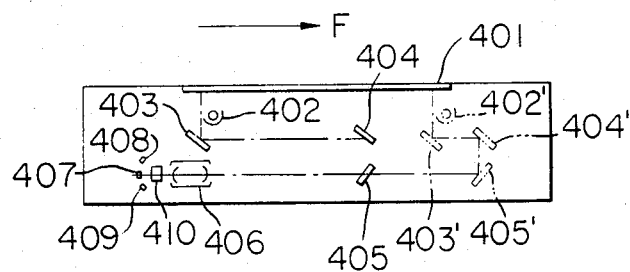
FIG. 25 is a schematic sectional view showing an example of an original readout device of the apparatus shown in FIG. 23.

FIG. 25 is a schematic sectional view of an original readout device of an input section of the printing apparatus of this embodiment. The device has the original glass table 401, the rod-shaped light source such as a halogen lamp or a fluorescent lamp, the first mirror 403, the second mirror 404, the third mirror 405, the lens 406, one-dimensional solid state image pickup elements 407, 408 and 409 such as CCDs, and a color separation beam splitter 410. Describing the mode of operation of this original readout device, the original placed on the original glass table 401 is illuminated by light emitted from the rod-shaped light source 402 and is scanned (subscanned) by the first mirror 403, the second mirror 404, and the third mirror 405. The light which has been guided through the mirrors 403, 404 and 405 and the lens 406 is separated into different colors by the beam splitter 410. The separated colors are sensed by the CCDs 407, 408 and 409. These three CCDs 407, 408 and 409 are arranged to hold a predetermined relationship with the beam splitter 410 so that the same portion of the image of the original may be simultaneously read out by these CCDs. The main scanning direction of the CCDs 407, 408 and 409 is normal to the plane of the drawing.

The mode of operation of the original readout device is the same as that described with reference to FIG. 17.

Figures 26, 26A:
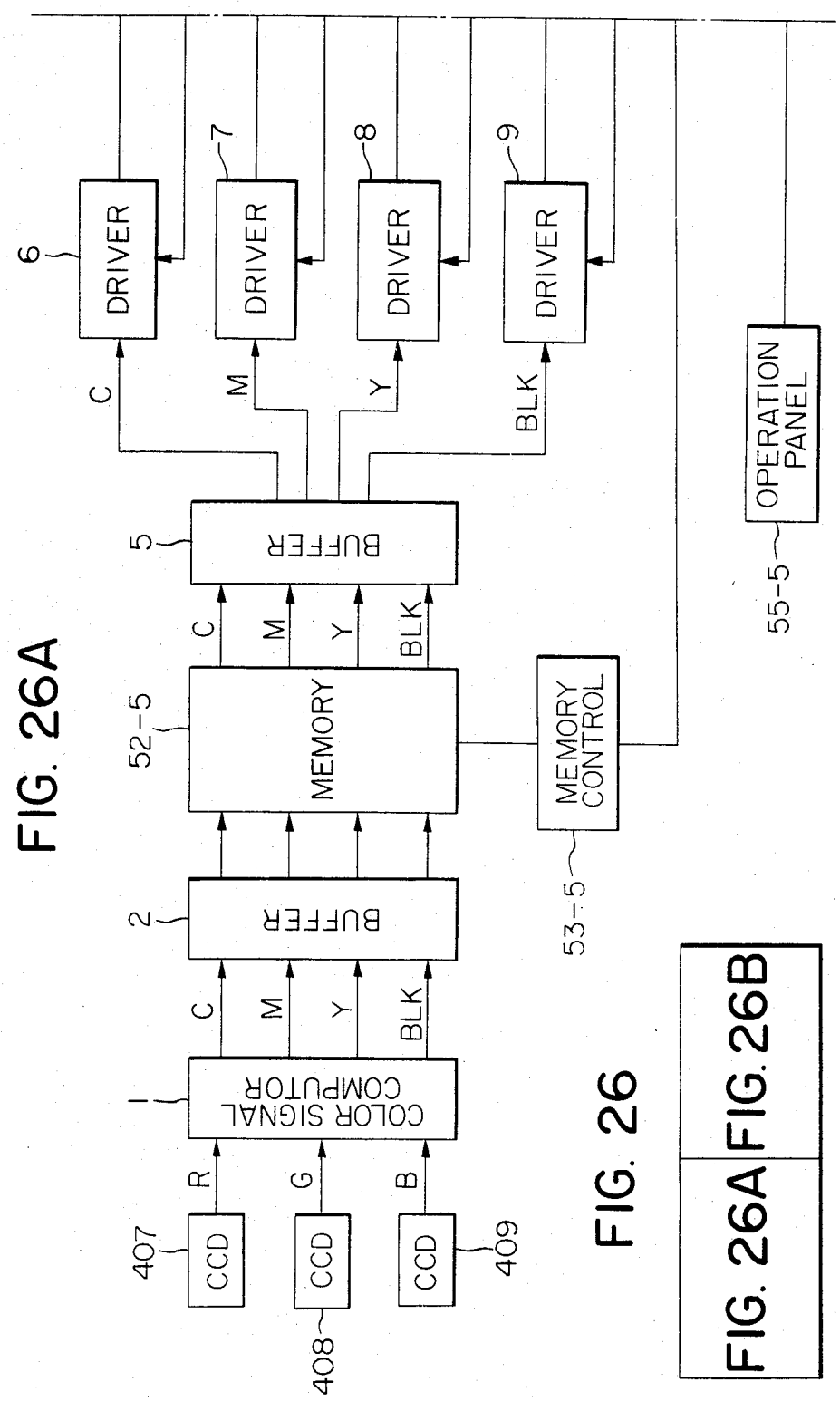
FIG. 26 composed of FIGS. 26A and 26B are block diagrams of an example of a control system for the apparatus shown in FIG. 23.
Figure 26B:
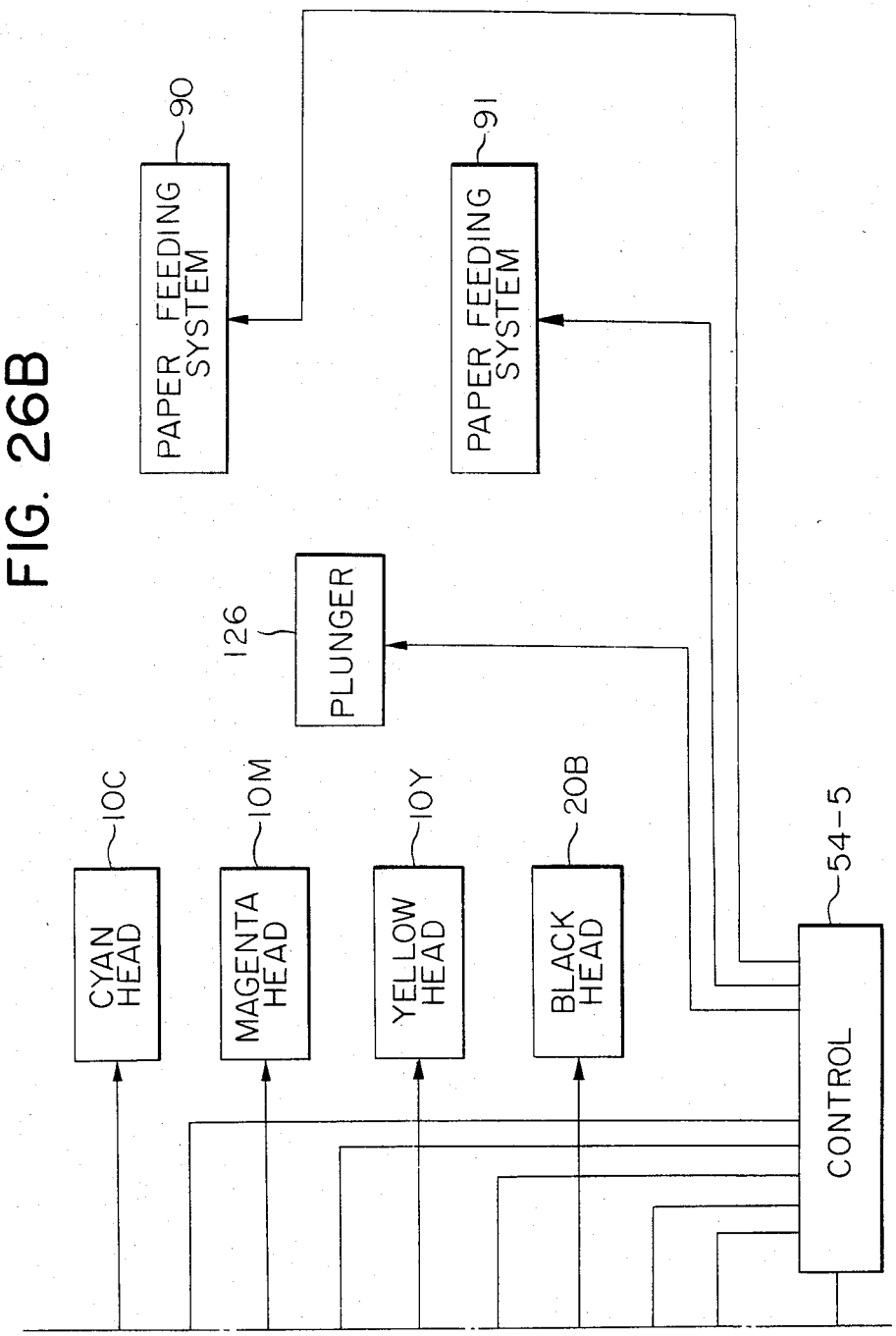

FIG. 26 shows an example of a control circuitry for the apparatus shown in FIGS. 23 to 25.

The circuitry has the CCDs 407, 408 and 409; a color signal computer 1; a first buffer 2; the memory 52-5 which is capable of both read and write operations; the memory control 53-3; a second buffer 5; drivers 6, 7, 8 and 9; the inkjet 10C for cyan (to be referred to as a cyan recording head hereinafter); the inkjet head 10M for magenta (to be referred to as a magenta recording head); the inkjet head 10Y (to be referred to as a yellow recording head); the black recording head 20B; the plunger 126 for driving the separator; a paper feed system 10 for the first recording unit; a paper feed system 11 for the second recording unit; a control 54-4 for controlling the overall electric circuitry and mechanical systems; and an operation panel 55-5. The operation panel 55-5 has a dial for setting the number of copies to be produced, a switch for designating the copying mode, a start button for initiating the recording operation, and so on.

The mode of operation of the circuitry shown in FIG. 26 will now be described. The light incident on the color separation beam splitter 410 (FIG. 25) is divided into red light which becomes incident on the CCD 407, green light which becomes incident on the CCD 408, and blue light which becomes incident on the CCD 409. The image data read out by the respective CCDs is supplied to the color signal computer 1 which produces a cyan signal C, a magenta signal M, a yellow signal Y and a black signal BLK. These signals are stored in the memory 3 comprising a RAM (random-access memory) or the like through the buffer 2. The capacity of the memory 52-5 is that of a page memory which is capable of storing data corresponding to one page of the original. This page memory is incorporated for storing data of four colors mentioned above. A memory control 4 produces an address signal, a timing signal or a read-/write signal for reading out and writing data from and in the memory 52-5.

The image data stored in the memory 52-5 is output to the buffer 5 under the control of the memory control 53-5. The cyan signal C is supplied to the driver 6 for the cyan recording head 10C, the magenta signal M is supplied to the driver 7 for the magenta recording head 10M, the yellow signal Y is supplied to the driver 8 for the yellow recording head 10Y, and the black signal BLK is supplied to the driver 9 for the black recording head 20B. Since the on/off operations of the drivers 6 to 9 are controlled by the control 54-5, the recording heads may be selected as required.

The control 54-5 also controls the on/off operations of the plunger 126 for the separator as well as the paper feed systems 10 and 11 comprising the pickup rollers 102 and 202; the register rollers 104 and 204; the first feed rollers 105 and 205; the convey belts 106 and 206; and the second feed rollers 108 and 208. By appropriately controlling the separator 120 and the paper feed systems 10 and 11 and by selectively turn on or off the recording units 100 and 200, printing may be performed in various modes.

Examples of printing modes are shown in Tables 2 and 3 below.

Table 2 shows a case wherein the image data supplied to the heads which are on is the same. In this case, two colors mix and recording colors as shown in Table 2 are obtained.

Table 3 shows a case wherein different image data are supplied to the respective recording heads which are on. In this case, mixing of colors is not caused and the colors of the selected heads are independently recorded. By supplying to the heads the same data and different pieces of data, combinations of printing modes of Tables 2 and 3 may also be achieved. For example, by combining modes 1 and 5, tricolor printing of cyan, magenta and purple may be performed.

TABLE 2

|  | Mode 1 | Mode 2 | Mode 3 |
|---|---|---|---|
| Separator 120 | OFF | OFF | OFF |
| Cyan recording head 10C | ON | ON | OFF |
| Magenta recording head 10M | ON | OFF | ON |
| Yellow recording head 10Y | OFF | ON | ON |
| Black head 20B | OFF | OFF | OFF |
| Recording paper sheet feed path | 1 | 1 | 1 |
| Recording color | Purple | Green | Orange |

TABLE 3

|  | Mode 4 | Mode 5 | Mode 6 | Mode 7 | Mode 8 |
|---|---|---|---|---|---|
| Separator 120 | ON | OFF | OFF | OFF | OFF |
| Cyan recording head 10C | ON | ON | ON | OFF | OFF |
| Magneta recording head 10M | ON | ON | OFF | ON | OFF |
| Yellow recording head 10Y | ON | OFF | ON | ON | OFF |
| Black recording head 20B | ON | OFF | OFF | OFF | ON |
| Recording paper sheet feed path | 1→2 | 1 | 1 | 1 | 2 |
| Recording color | polychromatic | Cyan + magenta | Cyan + yellow | Magenta + yellow | Black |

Figure 27C:
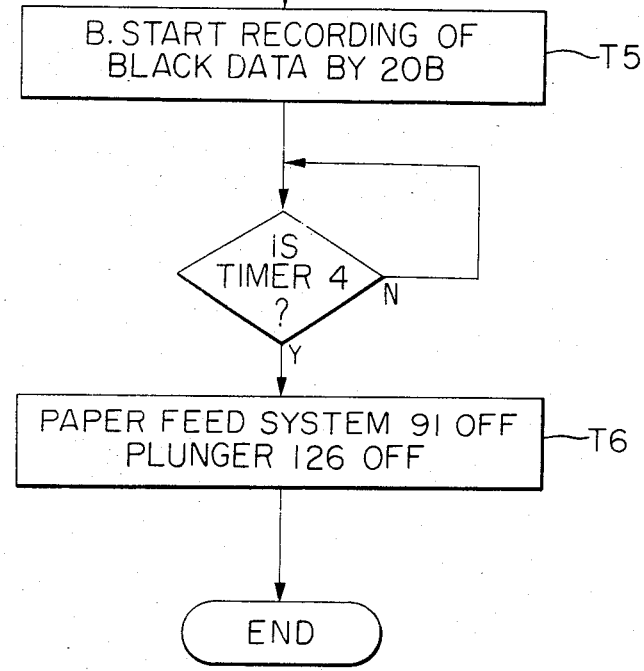
FIG. 27 composed of FIGS. 27A, 27B, 27C and 27D is a set of flow charts showing the steps for performing printing in various modes with the recording apparatus shown in FIG. 23.
Figure 27:
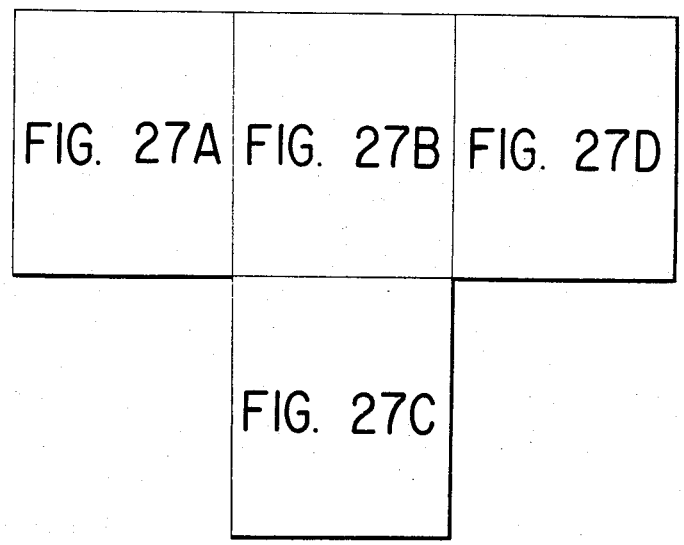
Figure 27A:
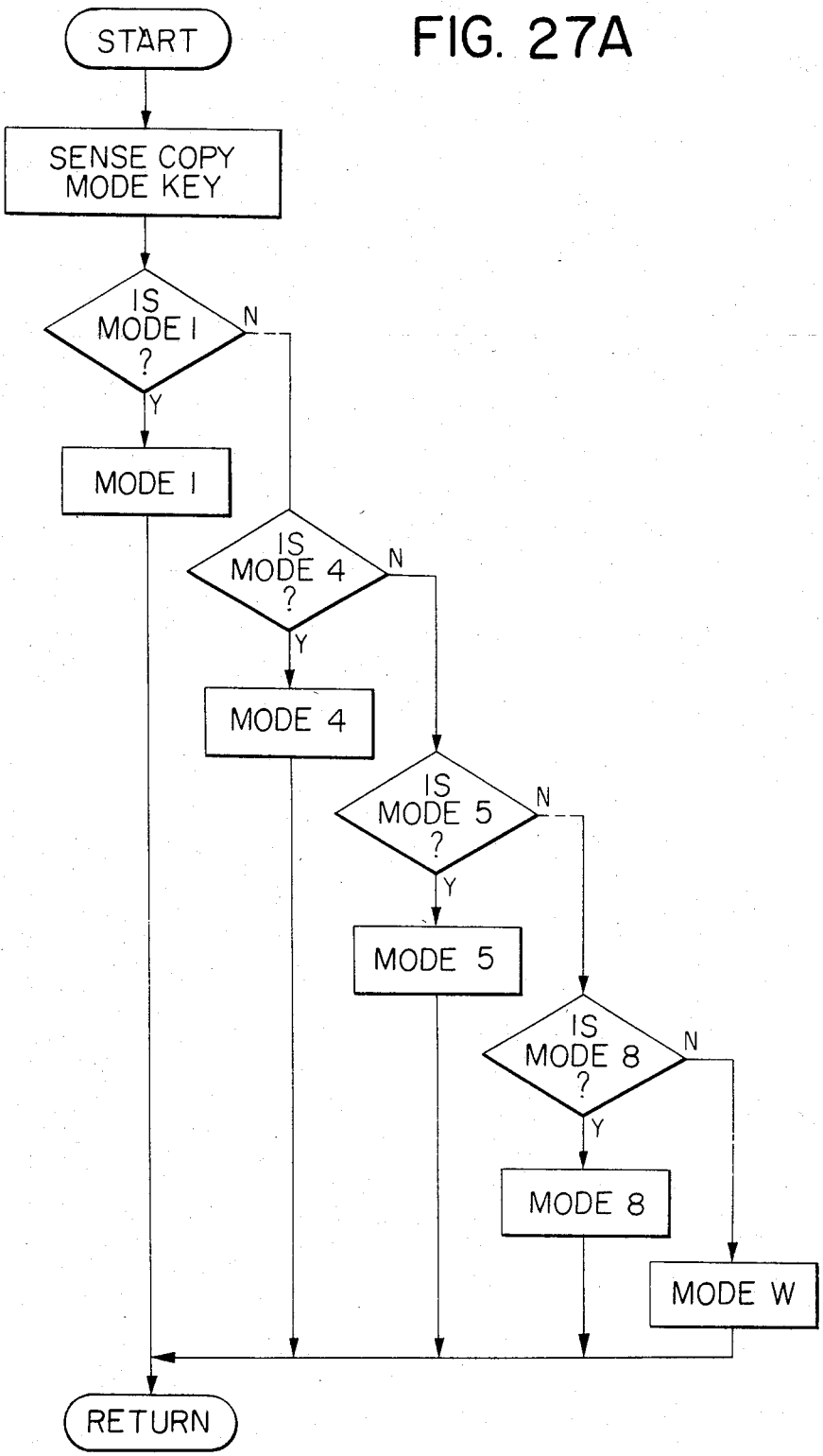
Figure 27B:
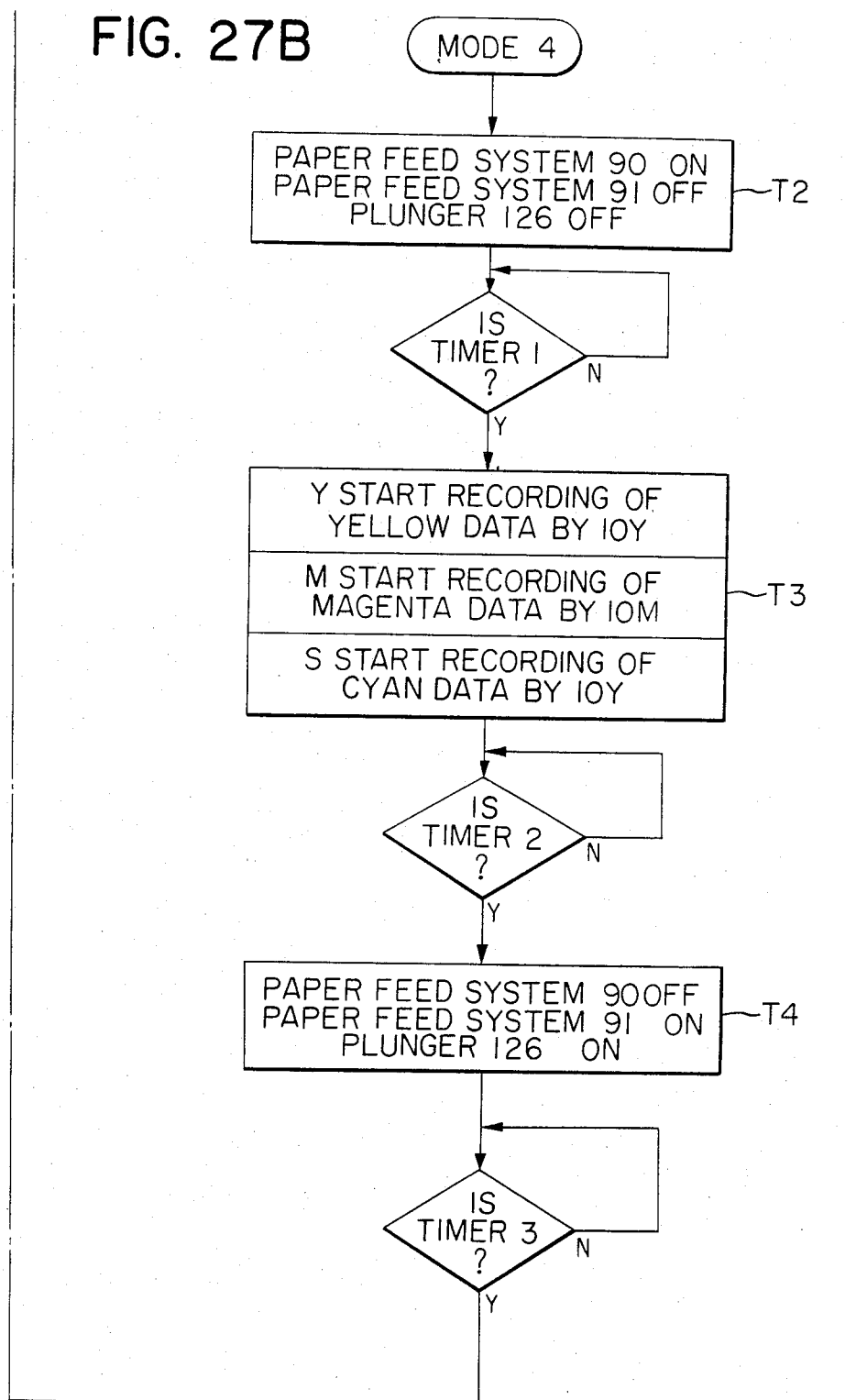
Figure 27D:
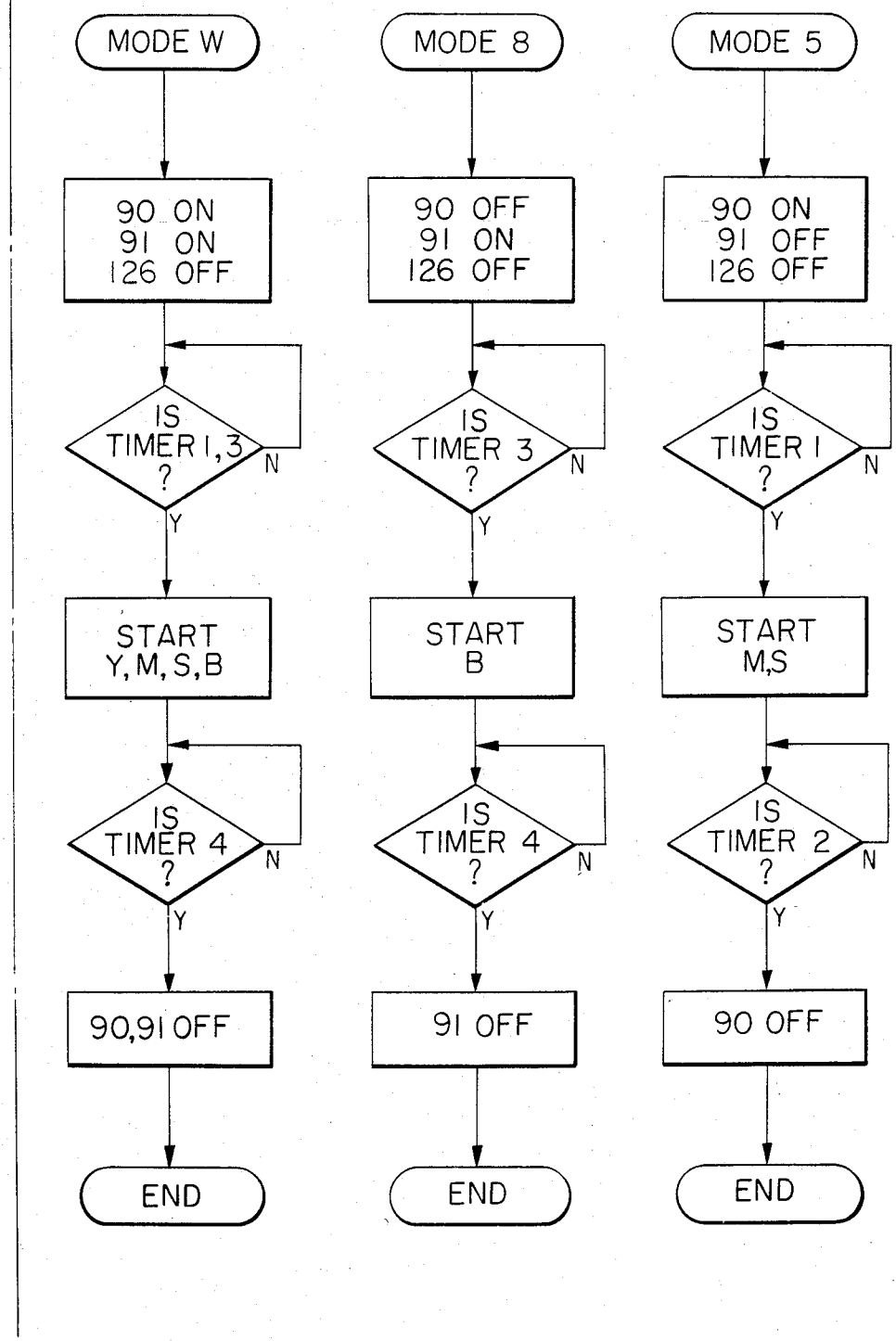

The mode of operation for recording in polychromatic mode 4 (Table 3) in this embodiment will now be described. FIG. 27 shows the control steps for this mode. The control 12 has a microcomputer, and a program of the flow shown in FIG. 27 is stored in a ROM. When the start button on the operation panel 55-5 is depressed to start printing, the operation of the copy mode switch on the operation panel 55-5 is sensed (step T1-1). In step T1-2, the input mode is discriminated. The flow then advances to step T2. The paper feed system 90 of the recording unit 100 is turned on, and the recording paper sheet stored in the cassette 115 is fed toward the recording unit 100. The plunger 126 for the separator 120 is turned on so as to direct the recording paper sheet toward the recording unit 200. In step T3, after a predetermined period of time (preset by a timer), the driver for the yellow recording head 10Y is turned on. The yellow signals are read out from the memory and are supplied to the head for recording in yellow. After the recording in yellow is completed, the driver for the yellow recording head 10Y is turned off. After a predetermined period of time, the drivers for the magenta recording head 10M and the cyan recording head 10C are seequentially turned on for recording in accordance with the magenta and cyan signals. In step T4, when the recording paper sheet subjected to recording at the first recording unit 100 reaches the register roller 204 of the second recording unit 200, the paper feed system 91 for the second recording unit 200 is turned on except for the feed rollers 202 and the paper feed system 91 for the first recording unit 100 is turned off. The separator 120 is kept on. In step T5, after a predetermined time from the time at which the paper feed system 91 is turned on, the black recording head BLK is turned on to perform recording in black. After recording in black is completed, the head 20B is turned off. After polychromatic recording, in step T6, the recording paper sheet is exhausted to the exhaust tray 211. The paper feed system 11 is turned off. The printing operation is then completed. The other printing modes are also performed in a similar manner.

In summary, according to the present invention, three recording heads for recording in each color of cyan, magenta and yellow and for polychromatic recording are incorporated at the first recording unit. In addition, the black recording head is incorporated at the second recording unit. The first recording unit performs polychromatic recording, while the second recording unit performs recording in black. Therefore, clear printing in black may be performed unlike the conventional cases wherein the respective recording heads for recording in cyan, magenta and yellow are selectively driven for polychromatic recording or recording in black. The printing apparatus of the present invention is particularly effective for recording a polychromatic image with black outlines. Furthermore, with the printing apparatus or system of the present invention, by simultaneously driving the first and second recording units as in the mode W shown in FIG. 27, it is possible to simultaneously produce, from a single original, a black copy and a copy of single color, a dichromatic color copy or a polychromatic copy of cyan, magenta and yellow. Thus, the present invention provides a printing apparatus of better printing performance.

In the embodiments described above, the inkjet recording was adopted as the recording means. Although inkjet heads are advantageous for compact apparatuses, the present invention is not limited to this and may be extended to thermal printing or electrostatic printing or the like. Further, in the embodiments described above, the original image read by the solid state image pickup elements is used as the recording image for the printing apparatus. However, the recording image may be characters, figures, and so on which may be generated by character generators or the like.

Copies of halftone mode, binary mode, and magnification change mode are obtained by the digitizer circuit as shown in FIG. 4, and copies of fine mode and normal mode may be obtained by the connections between the circuit 51 and the memory as shown in FIG. 6.

What we claim is:

1. A printing system comprising:
   first recording means for recording an image on a recording medium in a first mode;
   second recording means for recording an image on a recording medium in a second mode different from said first mode, said second recording means being different from said first recording means; and
   selecting means for selecting said first or second recording means to perform a recording operation;
   wherein one of said first and second modes is adapted for recording a halftone image.

2. A printing system comprising:
   first recording means for recording an image on a recording medium with a first element density;
   second recording means for recording an image on a recording medium with a second element density, said second recording means being different from said first recording means; and
   selecting means for selecting at least one of said first and second recording means to record an image with a desired element density.

3. A printing system according to claim 1 or 2, further comprising first feeding means for feeding the recording medium to said first recording means and second feeding means for feeding the recording medium to said second recording means.

4. A printing system comprising:
   a plurality of recording units arranged in series, one of said recording units recording an image in yellow, magenta and cyan, and another of said recording units recording an image in black;
   feeding means for feeding a recording medium to at least one of said recording units to record an image on the recording medium; and
   driving means for selectively driving at least one of said recording units in accordance with selection of a color to be recorded.

5. A printing system comprising:
   a plurality of generating means each of which is for recording an image of a respective different size on a recording medium;
   size signal inputting means for inputting a size signal; and
   selecting means for selecting one of said plurality of generating means in accordance with the size signal from said size signal inputting means.

6. A printing system according to claim 5, wherein each of said generating means has a recording head of a different in recording width.

7. A printing system according to claim 6, wherein each of said recording heads has a group of orifices.

8. A printing system according to claim 5, wherein said size signal inputting means comprises setting means for manually setting a desired image size, wherein said selecting means performs its selection operation in accordance with the size signal from said setting means.

9. A printing system according to claim 5, wherein said size signal inputting means comprises sensing means for sensing the size of the recording medium, wherein said selecting means performs its selection operation in accordance with the size signal from said sensing means.

10. A printing system according to claim 1 further including means for converting image data corresponding to an image to be recorded to data for recording in said first and second modes to supply to said first and second recording means, respectively.

11. A printing system according to claim 1, wherein one of said first and second modes comprises recording a half-tone image by utilizing the dither method.

12. A printing system according to claim 1, further comprising means for reading an original image by scanning the image, wherein said first and second recording means record images on the basis of image data from said reading means.

13. A printing system according to claim 2, further comprising means for converting image data according to an image to be recorded to image data of said first and second element densities to supply to said first and second recording means, respectively.

14. A printing system according to claim 2, wherein said first and second recording means actuate together to simultaneously record images of different densities, respectively.

15. A printing system according to claim 2, wherein said first and second recording means have recording heads for recording picture elements with different element densities, respectively.

16. A printing system according to claim 2, further including means for reading an original image by scanning the image, wherein said first and second recording means record images on the basis of image data from said reading means.

17. A printing system according to claim 4, further comprising means for feeding the identical recording medium in sequence to each of said recording units for recording an image in full color.

18. A printing system according to claim 4, further comprising means for specifying a color for recording an image.

19. A printing system according to claim 4, further comprising means for storing a plurality of recording media, wherein said feeding means feeds a recording medium from said storing means.

20. A printing system comprising:
first recording means for recording an image on a recording medium with a first element density;
second recording means for recording an image on a recording medium with a second element density higher than the first element density for halftone recording;
selecting means for selecting halftone image recordings; and
driving means for driving said first or second recording means in accordance with selection by said selecting means.

21. A printing system according to claim 20, wherein halftone image recording is effected by said second recording means.

22. A printing system according to claim 20, wherein said first and second recording means are arranged in one unit.

23. A printing system according to claim 20, further comprising means for reading an original image by scanning the image, wherein said first and second recording means record images on the basis of image data from said reading means.

* * * * *

UNITED STATES PATENT AND TRADEMARK OFFICE
CERTIFICATE OF CORRECTION

PATENT NO. : 4,521,805
DATED : June 4, 1985
INVENTOR(S) : NAOKI AYATA, ET AL.

It is certified that error appears in the above-identified patent and that said Letters Patent is hereby corrected as shown below:

Column 1, line 12, change "some" to --same--.

Column 2, line 32, insert --system-- after "control".

Column 3, line 62, change "on" to --of--.

Column 8, line 13, change "now" to --not--.

Column 9, line 36, delete "are".

Column 11, line 9, insert --the-- before "white";
             line 26, change "A still another" to --Another--; and
             line 50, change "wavelength" to --wavelengths-- (both occurrences).

Column 12, line 9, insert --the-- before "shorter".

Column 13, line 40, insert --be-- before "written".

Column 15, line 17, delete "to" following "possible" and insert --to-- following "original,".

UNITED STATES PATENT AND TRADEMARK OFFICE
CERTIFICATE OF CORRECTION

PATENT NO. : 4,521,805

DATED : June 4, 1985

INVENTOR(S) : NAOKI AYATA, ET AL.

It is certified that error appears in the above-identified patent and that said Letters Patent is hereby corrected as shown below:

Column 17, line 62, change "turn" to --turning--.

Column 18, line 61, change "seequentially" to --sequentially--.

Column 20, line 31, delete "in".

Signed and Sealed this

Twenty-third Day of September 1986

[SEAL]

Attest:

DONALD J. QUIGG

Attesting Officer     Commissioner of Patents and Trademarks